(12) United States Patent
Tomori et al.

(10) Patent No.: US 6,865,658 B2
(45) Date of Patent: Mar. 8, 2005

(54) NONVOLATILE DATA MANAGEMENT SYSTEM USING DATA SEGMENTS AND LINK INFORMATION

(75) Inventors: Nobuaki Tomori, Nara (JP); Katsumi Fukumoto, Nara (JP); Kazuhiro Okamoto, Nara (JP)

(73) Assignee: Sharp Kabushiki Kaisha, Abeno-ku (JP)

( * ) Notice: Subject to any disclaimer, the term of this patent is extended or adjusted under 35 U.S.C. 154(b) by 379 days.

(21) Appl. No.: 10/010,796

(22) Filed: Dec. 7, 2001

(65) Prior Publication Data

US 2002/0085433 A1 Jul. 4, 2002

(30) Foreign Application Priority Data

Dec. 7, 2000 (JP) ........................................ 2000-373609

(51) Int. Cl.[7] .............................................. G06F 12/00
(52) U.S. Cl. ........................................................ 711/173
(58) Field of Search ................................ 711/103, 173; 365/230.03

(56) References Cited

U.S. PATENT DOCUMENTS 5,717,919 A * 2/1998 Kodavalla et al. ............. 707/8
5,832,493 A * 11/1998 Marshall et al. ............ 707/101
5,987,478 A * 11/1999 See et al. .................... 707/205
6,269,434 B1 * 7/2001 Tanaka ........................ 711/170
6,430,650 B1 * 8/2002 Miyauchi .................... 711/103

FOREIGN PATENT DOCUMENTS

| EP | 563997 A1 * | 10/1993 |
| EP | 675493 A2 * | 10/1995 |
| JP | 01-251230 | 10/1989 |
| JP | 06-202821 | 7/1994 |
| JP | 07-044451 | 2/1995 |
| JP | 09-097139 | 4/1997 |

* cited by examiner

Primary Examiner—Christian P. Chace
(74) Attorney, Agent, or Firm—Morrisou & Foerster LLP

(57) ABSTRACT

A data management system and method use link information stored with a plurality of data segments. The data management system includes: a nonvolatile semiconductor storage section including a plurality of blocks; a storage control section; a data management system control section for processing data to be stored in the nonvolatile semiconductor storage section; and a data management system memory section for storing management data. The data management system control section performs data management by dividing the data into data segments in units of a sector which is a logical unit for data management; storing data link information which indicates the ordinal relationship of the data segments, together with the data segments, in the nonvolatile semiconductor storage section; and storing, as link information in each sector, information about immediately-previous and immediately-subsequent data storage sites.

34 Claims, 24 Drawing Sheets

FIG.3

ID management table

| ID number | Logical block number | Logical sector number | Data size |
|---|---|---|---|
| 10 | 2 | 3 | 200 |
| ... | ... | ... | ... |

CONVENTIONAL ART

CONVENTIONAL ART

CONVENTIONAL ART

FIG.21

Block information table 10

CONVENTIONAL ART

| Physical block number (PBN) | Logical block number (LBN) | Block state |
|---|---|---|
| 0 | 0 | INCLUDES DATA |
| 1 | 1 | BLOCK FULL |
| ⋮ | ⋮ | ⋮ |

FIG.22

Sector information table 11

CONVENTIONAL ART

| Physical block number (PBN) | Physical sector number (PSN) | Logical sector number (LSN) | Sector state |
|---|---|---|---|
| 0 | 1 | 100 | DATA VALID |
| 0 | 2 | 10 | DATA INVALID |
| ⋮ | ⋮ | ⋮ | ⋮ |

FIG.23

Sector information table 12

CONVENTIONAL ART

| Physical block number (PBN) | Number of "UNUSED" sectors | Number of "DATA VALID" sectors | Number of "DATA INVALID" sectors |
|---|---|---|---|
| 0 | 100 | 20 | 7 |
| 1 | 0 | 50 | 77 |
| ⋮ | ⋮ | ⋮ | ⋮ |

CONVENTIONAL ART

NONVOLATILE DATA MANAGEMENT SYSTEM USING DATA SEGMENTS AND LINK INFORMATION

CROSS-REFERENCE TO RELATED APPLICATIONS

This application claims priority to Japanese Patent Application Number 2000-373609 filed Dec. 7, 2000, the content of which is incorporated herein by reference in its entirety.

BACKGROUND OF THE INVENTION

1. Field of the Invention

The present invention relates to a data management system having a data link structure which is used in an information processing apparatus in which a nonvolatile memory is used as a data recording medium, and an extended recording apparatus therefor, such as a handheld computer, an electronic notebook, a cellular phone, a memory card reader, etc. The present invention also relates to a data management method which uses the data management system.

2. Description of the Related Art

Conventionally, hard magnetic disk drives have been used in many computers as data recording devices. The features and advantages of the hard magnetic disk drives reside in that data is recorded in a nonvolatile manner, and that reading and rewriting of data can be performed by units of one sector (for example, 512 bytes), and overwriting of data is possible. On the other hand, disadvantages of these type of hard disk drives reside in that their physical sizes are large, they consume a relatively large amount of electric power, and they are sensitive to vibration and shock.

The advantages of semiconductor memories formed of flash memories reside in that they have a compact size and are resistant to vibration and shock, and that power consumption thereof is much smaller as compared with the above hard magnetic disk drives. On the other hand, the disadvantages of such semiconductor memories formed of flash memories reside in that reading and writing of data are performed by units of one byte (word), that it is necessary to perform a data erasing operation (typically, 64 kilobytes) for rewriting data, and overwriting of data is impossible, and that the number of times that a block erasing operation can be performed is limited (typically, up to one hundred thousand times).

In a flash memory, electrical writing and erasing of data are possible, and the written data are stored in a nonvolatile manner unless it is erased (typically, 64 kilobytes). The erasing operation in the flash memory is performed by units of a block (typically, 64 kilobytes), which is significantly greater than the minimum unit of rewriting in the hard magnetic disk drive (for example, 512 bytes).

The erasing operation in the flash memory is typically achieved by extracting an electron from a floating gate such that the threshold value of a memory cell is decreased (about 3 V or less). The writing operation in the flash memory is typically achieved by injecting an electron into a floating gate such that the threshold value of a memory cell is increased (about 5.5 V or more).

Generally, in a flash memory, the time required for writing a 1 byte (word) is about 20 microseconds. However, the time required for an erasing operation (typically, 64 kilobytes) is about 1 second, which is much longer than the above writing operation time. Furthermore, disadvantageously, the guaranteed number of times of the erasing operation is limited (typically, up to one hundred thousand times). Thus, when the erasing operation (typically, 64 kilobytes) is performed for rewriting one sector of data (for example, 512 bytes), one or more seconds are required as a data rewriting time (a data erasing time plus a data writing time), which is much longer than the data rewriting time in the hard magnetic disk drive.

For example, Japanese Laid-Open Publication No. 6-202821 and Japanese Laid-Open Publication No. 9-97139 propose methods for performing data management in an efficient manner with the minimum number of times of the erasing operation that consumes a long operation time, i.e., techniques for achieving an efficient file system which is adapted to flash memories.

In Japanese Laid-open Publication No. 6-202821, in order to realize a file storage system similar to that of a solid memory disk using a plurality of flash memories, an erasure block of each flash memory includes a data space for storing sectors of data and a block/sector conversion table. In the block/sector conversion table, sectors of each data which are stored in the data space of the block are identified by sector numbers.

In order to realize a file system for flash memories, a management apparatus disclosed in Japanese Laid-Open Publication No. 9-97139 includes a management section and an abandonment section. The management section forms a plurality of storage blocks each including a data region and a management region corresponding to the data region in the flash memory. In each block, state information which represents the recording state of the data region is stored in the management region. The management section controls accesses to the data region based on the state information. The abandonment section updates the state information stored in a management region in a designated storage block into information representing that the designated data region is invalid, thereby abandoning this designated data region.

Japanese Laid-Open Publication No. 1-251230 and Japanese Laid-Open Publication No. 7-44451 propose techniques related to a data link structure. Herein, the data link structure means a structure where data itself possesses information about the relationship among the sites of data distributed over a recording medium, e.g., a data sequence order, and where data are interrelated to each other in the form of a logical chain. Hereinafter, information about the relationship among the sites where data are stored is referred to as data link information.

Japanese Laid-Open Publication No. 1-251230 describes a program conversion system. This system includes a storage section and a control section. The storage section stores data in a plurality of blocks while storing previous-link information which points to a previous block and subsequent-link information which points to a subsequent block in each block. The control section controls the data linkage such that previous-link information of the first block points to the last block, and subsequent-link information of the last block points to the first block.

Japanese Laid-Open Publication No. 7-44451 describes a data storage apparatus which includes a data storage section and first and second reading sections. The data storage section stores, in each of a plurality of data storage regions, storage address data for previous and subsequent data together with main data. The first reading section reads stored data according to an order determined based on the storage address data. The second reading section reads the stored data according to a predetermined order in the case of a problem with the next data storage address such that the next data cannot be read out.

Hereinafter, a conventional data management method is described in detail with reference to FIGS. 13 through 16.

In a memory where the minimum physical unit of data which is erased at one time (herein, referred to as "erasure block"; shown in FIG. 13 as an area enclosed by solid lines) is relatively large (e.g., 64 kilobytes), when data management is to be performed such that data is erased in units of a sufficiently small virtual data segment, in usual cases, an erasure block (64 kilobytes) is virtually divided into a plurality of sectors (e.g., 1 sector=512 bytes; shown in FIG. 13 as areas enclosed by broken lines).

FIG. 14 shows a structure of a sector. As shown in FIG. 14, each of these sectors stores, in addition to main data, an address number which is used for identifying data to be written, and a flag which indicates a write state (which includes three types of state, "DATA VALID", "DATA INVALID", and "UNUSED").

Writing of data is performed in units of a sector by updating the flag which indicates the write state from "UNUSED" to "DATA VALID". When rewriting (updating) data or erasing data, a physical erasing operation is not performed on data to be updated or erased. Instead, the flag of a sector to be updated or erased is updated from "DATA VALID" to "DATA INVALID", whereby validity/invalidity of the entire data in that sector can be expressed as shown in FIG. 15.

After such rewriting of data is repeated, there may be a plurality of logical sectors (sectors that are managed with the above-described address numbers and/or state information) having the same address number. However, in this case, the number of logical sectors which have a flag which indicates "DATA VALID" is always one. When reading data, the latest data is specified by sequentially searching through logical sectors, using the address number and the valid flag as conditions for the search.

When data is rewritten, what is actually performed is writing of data in an unused sector. Although old data is virtually erased (the flag is invalidated), the old data is physically left at the same site in a memory region. After the entire erasure block has been occupied with data, when a further data writing/updating operation is performed, it is necessary to perform an erasing operation on the erasure block in order to render sectors that contain invalid data available. This erasing operation is referred to as a "reconstruction (or reclaim)" operation.

In order to perform this reconstruction operation, it is necessary to reserve one erasure block. In this operation, from any selected block (the upper block in FIG. 16), only data stored in sectors which have valid flags are copied, in units of one sector, into the reserved erasure block (the lower block), and then, the data in the selected block are all erased. Through this process, relocation of data is performed such that unused sectors are gathered in a group as shown in the lower part of FIG. 16. One reserved erasure block is sufficient regardless of the number of erasure blocks which are used for data management, but the reserved erasure block must have the same physical capacity as those of the other erasure blocks.

FIG. 17 illustrates an exemplary state of conventional data storage. As shown in FIG. 17, for each data, an identification (ID) number which is unique to the data in the system, state information which indicates "DATA VALID" or "DATA INVALID", header information concerning stored data, such as data size, and main data are stored in physically-contiguous address regions.

FIG. 18 illustrates another exemplary state of conventional data storage. As shown in FIG. 18, for each data, an identification (ID) number which is unique to the data in the system, state information which indicates "DATA VALID" or "DATA INVALID", data size, and header information concerning data stored in a leading address among the addresses where main data is stored (link information) are stored in physically-contiguous address regions. The main data does not physically follow the address region where the header information is stored. That is, the main data is stored in an address region physically following the leading address designated in the header information. In this storage method, the header information and the main data are stored in a separated manner, and header regions of respective data are managed together. Thus, an area to be searched through for a desired piece of data (ID number) is small, and accordingly, when reading data, data processing can be performed at a high rate.

Hereinafter, a conventional data management method is described in detail with reference to FIGS. 19 through 29.

FIG. 19 is a block diagram showing a structure of a file system using a conventional flash memory, which was conceived by one of the present inventors and is disclosed in Japanese Laid-Open Publication No. 2001-051889 (Japanese Patent Application No. 11-254973). In FIG. 19, a flash memory file system 1 includes a file system control section 2, a file system memory section 3, a flash memory control section 4, a flash memory section 5, and an application or operating system (OS) 6.

The file system control section 2 controls the processing to take place in the file system 1. The file system memory section 3 stores data management information which is used by the flash memory file system 1. The flash memory control section 4 controls data processing for the flash memory section 5 (e.g., data write processing, data read processing, etc.). The flash memory section 5 is a means for storing data. The application or operating system (OS) 6 is a program which requests the flash memory file system 1 to perform data processing.

FIG. 20 is a data structure diagram showing the data structure stored in the flash memory section 5. As shown in FIG. 20, the flash memory section 5 includes a plurality of physical blocks or "erasure blocks" 51. Each erasure block 51 is divided into a plurality of physical sectors 52 (which are the units by which data is processed). Each physical sector 52 within each erasure block 51 has a unique physical sector number. If each erasure block 51 is 64 Kbytes in size and each physical sector 52 is 512 bytes in size, then each erasure block 51 includes 128 physical sectors 52. That is, for example, physical block #0 includes a block control sector 52a containing control information, and physical sectors #1 to #127 as data regions.

One of the erasure blocks 51 in the flash memory section 5 is secured or reserved in advance as a reserve erasure block (in which data has yet to be written) for use in the reconstruction of the file system 1. The first physical sector 52 of each erasure block 51 is secured in advance as a block control sector 52a (physical sector #0) for storing the control information for that erasure block 51.

In the block control sector 52a of each erasure block 51, 2 bytes of state information concerning the erasure block 51, 2 bytes of state information concerning the physical sector (#1) 52, 2 bytes of state information concerning the physical sector (#2) 52, . . . 2 bytes of state information concerning the physical sector (#127) 52 are sequentially provided. Thus, the block control sector 52a contains 2 bytes.times.128=256 bytes of information.

The state information concerning the erasure block 51 (having the size of 64 kilobytes) includes a logical block number (one of 0 to 255) as assigned by the file system control section 2 and data which represents one of the five following block states: (1) "11111111b" representing "UNUSED"; (2) "11111110b" representing "RECEIVING DATA"; (3) "11111100b" representing "ERASING ORIGINAL BLOCK"; (4) "11111000b" representing "INCLUDES DATA"; or (5) "11110000b" representing "BLOCK FULL". The label "b" at the end of each bit string indicates "binary".

Similarly to the state information of the erasure block 51, the state information of each sector 52 of the erasure block 51 includes: a logical sector number (0 to 4095; 12 bits) which is uniquely assigned within the system by the file system control section 2; and data which represents one of the following five sector states (4 bits): (1) "1111b" representing "UNUSED"; (II) "1110b" representing "WRITING DATA"; (III) "1100b" representing "DATA WRITE COMPLETE"; (IV) "1100b" representing "DATA VALID"; or (V) "0000b" representing "DATA INVALID". The label "b" at the end of each bit string indicates "binary".

FIG. 21 is a data structure diagram showing a structure of management data concerning each erasure block 51 (hereinafter referred to as the "block information table 10") stored in the file system memory section 3 of the file system shown in FIG. 19, which shows the data structure of the respective erasure blocks 51.

In the block information table 10 of FIG. 21, each information unit consists of a physical block number, a logical block number, and a block state. Thus, the block information table 10 illustrates an erasure block 51 whose physical block number=0, logical block number=0 and block state="INCLUDES DATA": an erasure block 51 whose physical block number=1, logical block number=1, and block state="BLOCK FULL" (or "DATA FULL"); and so on.

FIG. 22 is a data structure diagram showing a structure of management data concerning each physical sector 52 (hereinafter referred to as the "sector information table 11") stored in the file system memory section 3 of the file system shown in FIG. 19, which shows the data structure of the respective physical sectors 52.

In the sector information table 11 of FIG. 22, each information unit consists of a physical block number, a physical sector number, a logical sector number, and a sector state. Thus, the sector information table 11 illustrates a sector 52 whose physical block number=0, physical sector number=1, logical sector number=100, and sector state= "DATA VALID"; a sector 52 whose physical block number= 0, physical sector number=2, logical sector number=10, and sector state="DATA INVALID"; and so on.

FIG. 23 is a data structure diagram showing a structure of management data (hereinafter referred to as the "sector information table 12") stored in the file system memory section 3 of the file system shown in FIG. 19, showing the number of physical sectors 52 for each sector state within each physical block 51. Specifically, the sector information table 12 shows the number of "UNUSED" sectors 52, the number of "DATA VALID" sectors 52, and the number of "DATA INVALID" sectors 52 in each erasure block 51.

In the sector information table 12 of FIG. 23, each information unit consists of a physical block number, the number of "UNUSED" sectors, the number of "DATA VALID" sectors, and the number of "DATA INVALID" sectors. Thus, the sector information table 12 illustrates an erasure block 51 whose physical block number=0, number of "UNUSED" sectors=100, number of "DATA VALID" sectors=20, and number of "DATA VALID" sectors=7; an erasure block 51 whose physical block number=1, number of "UNUSED" sectors=0, number of "DATA VALID" sectors=50, and number of "DATA INVALID" sectors=77; and so on.

The block information table 10 (FIG. 21), the sector information table 11 (FIG. 22), and the sector information table 12 (FIG. 23) are generated by reading the block control sector 52a of each erasure block 51 from the flash memory section 5 via the flash memory control section 4 by the file system control section 2 at the time when the file system 1 is activated.

It would be possible to use the file system 1 without generating the block information table 10, the sector information table 11, and the sector information table 12 because the information of these tables is stored in the block control sector 52a of each erasure block 51. However, when the file system memory section 3 is formed of a RAM, for example, the file system memory section 3 operates at a faster speed than the flash memory section 5. Therefore, by storing the generated block information table 10, sector information table 11, and sector information table 12 in the file system memory section 3, it becomes possible to quickly grasp the internal state of the flash memory section 5 and where given data is stored. In addition, the operation speed of the file system 1 can be effectively enhanced by utilizing the file system memory section 3 because the amount of data exchanged with the flash memory section 5 is reduced.

(Data Read Operation)

FIG. 24 is a flowchart illustrating a read operation for data which is stored in the flash memory section 5 according to a conventional technique.

First, referring to FIG. 24, when a data read request for reading data from the flash memory section 5 is issued from the application or operating system 6, the read request and a logical sector number are supplied from the application or operating system 6 to the file system control section 2.

The file system control section 2 accesses the sector information table 11 in the file system memory section 3 to search for the supplied logical sector number and confirm that the logical sector number has the "DATA VALID" sector state. The file system control section 2 obtains a physical sector number corresponding to this logical sector number, and supplies the obtained physical sector number to the flash memory control section 4 (Step 121).

The flash memory control section 4 accesses the flash memory section 5 based on this physical sector number to perform a read operation for a sector at a physical storage location that corresponds to the physical sector number. The flash memory control section 4 supplies the data which has been read to the file system control section 2 (Step 122).

If there is more data to be read, the control returns to Step 121 (following the "YES" path from Step 123). If there is no more data to be read, the control is terminated (following the "NO" path from Step 123).

(Data Write Operation)

FIGS. 25 to 27 are flowcharts illustrating a write operation for writing data to the flash memory section 5 according to a conventional technique.

First, referring to FIG. 25, when a data write request for writing data to the flash memory section 5 is issued from the application or operating system 6, the write request, a logical sector number, and the data to be written are supplied from the application or operating system 6 to the file system control section 2.

The file system control section 2 accesses the sector information table 12 in the file system memory section 3 to obtain a physical block number which has the largest number of "UNUSED" sectors (such a physical block number indicates an erasure block 51 to which writing may be safely performed) (Step 131). The file system control section 2 confirms whether or not a physical block number has been successfully obtained (Step 132). If a physical block number has not been successfully obtained (following the "NO" path from Step 132), the file system 1 is reconstructed in order to secure an erasure block 51 to which writing may be safely performed (Step 133).

If a physical block number having the largest number of "UNUSED" sectors has been successfully obtained (following the "YES" path from Step 132), the file system control section 2 accesses the sector information table 11 to obtain a physical sector number which has the "UNUSED" sector state, from among the physical sector numbers that correspond to the physical block number obtained at Step 131 or 133. The file system control section 2 further accesses the sector information table 12 to decrement the number of "UNUSED" sectors corresponding to the physical block number by one and increment the number of "DATA VALID" sectors corresponding to the physical block number by one (Step 134).

Thereafter, the file system control section 2 accesses the block information table 10 to confirm whether the block state associated with the physical block number obtained at Step 131 or 133 is "UNUSED" or not (Step 135). If the block state is confirmed to be "UNUSED" (following the "YES" path from Step 135), the file system control section 2 accesses the flash memory section 5 via the flash memory control section 4. The file system control section 2 changes the logical block number of the block control sector 52*a* of the erasure block 51 corresponding to the physical block number obtained at Step 131 or 133 to that physical block number, and changes the block state of this block control sector 52*a* from "UNUSED" to "INCLUDES DATA". Similarly, the file system control section 2 accesses the block information table 10, changes the logical block number corresponding to the physical block number obtained at Step 131 or 133 to that physical block number, and changes the block state of this block control sector 52*a* from "UNUSED" to "INCLUDES DATA" (Step 136). Then the control proceeds to Step 137. If the block state is not "UNUSED" (following the "NO" path from Step 135), the control skips Step 136 and proceeds to Step 137.

Next, referring to FIG. 26, the file system control section 2 accesses the sector information table 12 to confirm whether the number of "UNUSED" sectors corresponding to the physical block number obtained at Step 131 or 133 is 0 or not (Step 137). If the number of "UNUSED" sectors is 0 (following the "YES" path from Step 137), the file system control section 2 accesses the flash memory section 5 via the flash memory control section 4, and changes the block state of the block control sector 52*a* of the erasure block 51 corresponding to that physical block number from "INCLUDES DATA" to "BLOCK FULL". Similarly, the file system control section 2 accesses the block information table 10, and changes the block state associated with the physical block number obtained at Step 131 or 133 from "INCLUDES DATA" to "BLOCK FULL" (Step 138).

Next (or following the "NO" path from Step 137), the file system control section 2 accesses the flash memory section 5 via the flash memory control section 4, and writes the logical sector number which has been supplied from the application or operating system 6 in the logical sector number within the block control sector 52*a* of the erasure block 51 that corresponds to the physical block number obtained at Step 131 or 133 and to the physical sector number obtained at Step 134. Also, the file system control section 2 changes the sector state of this sector 52 from "UNUSED" to "WRITING DATA". Similarly, the file system control section 2 accesses the sector information table 11, and changes the logical sector number that corresponds to the physical block number obtained at Step 131 or 133 and to the physical sector number obtained at Step 134 to the logical sector number which has been supplied from the application or operating system 6. Also, the file system control section 2 changes the sector state of this sector 52 from "UNUSED" to "WRITING DATA" (Step 139).

Thereafter, the file system control section 2 accesses the flash memory section 5 via the flash memory control section 4, and writes the data which has been supplied from the application or operating system 6 to the sector 52 that corresponds to the physical block number obtained at Step 131 or 133 and to the physical sector number obtained at Step 134 (Step 140).

After completing writing to the sector 52 within the flash memory section 5, the file system control section 2 changes the sector state within the block control sector 52*a* of the erasure block 51 that corresponds to the physical block number obtained at Step 131 or 133 and to the physical sector number obtained at Step 134 from "WRITING DATA" to "DATA WRITE COMPLETE". Similarly, the file system control section 2 accesses the sector information table 11, and changes the sector state that corresponds to the physical block number obtained at Step 131 or 133 and to the physical sector number obtained at Step 134 from "WRITING DATA" to "DATA WRITE COMPLETE" (Step 141).

Then, the file system control section 2 confirms whether or not the data which has been written to the sector 52 within the flash memory section 5 is an update of any data that has already been written in the flash memory section 5 (Step 142).

If the written delta is updated data, (following the "YES" path from Step 142), the file system control section 2 accesses the sector information table 11, and obtains the physical sector number and the physical block number of a sector 52 in which any existing data is stored (i.e., a sector 52 which has the same logical sector number as the logical sector number of the sector 52 for which writing was performed at Step 140 but which has a different physical sector number from the physical sector number of the sector 52 for which writing was performed at Step 140) (Step 143 in FIG. 27).

Then, the file system control section 2 accesses the flash memory section 5 via the flash memory control section 4, and changes the sector state within the block control sector 52*a* of the erasure block 51 that corresponds to the aforementioned physical block number and physical sector number from "DATA VALID" to "DATA INVALID". Similarly, the file system control section 2 accesses the sector information table 11, and changes the sector state that corresponds to the aforementioned physical block number and physical sector number from "DATA VALID" to "DATA INVALID". The file system control section 2 further accesses the sector information table 12 to decrement the number of "DATA VALID" sectors corresponding to this physical block number by one and increment the number of "DATA INVALID" sectors corresponding to this physical block number by one (Step 144).

Thereafter, the file system control section 2 accesses the flash memory section 5 via the flash memory control section 4, and changes the sector state within the block control sector 52a of the erasure block 51 that corresponds to the physical block number and the physical sector number obtained at Step 143 from "DATA WRITE COMPLETE" to "DATA VALID". Similarly, the file system control section 2 accesses the sector information table 11, and changes the sector state that is associated with the aforementioned physical block number and physical sector number from "DATA WRITE COMPLETE" to "DATA VALID" (Step 145).

Subsequently, the file system control section 2 confirms whether there is any more data to be written (Step 146). If there is more data to be written (following the "YES" path from Step 146), the control returns to Step 131. If there is no more data to be written (following the "NO" path from Step 146), the data write operation is terminated.

(Reconstruction Process)

FIGS. 28 and 29 are flowcharts illustrating a reconstruction process in the flow of FIG. 25 (Step 133).

If the "NO" path from Step 132 was taken, in FIG. 28, the file system control section 2 accesses the sector information table 12, and receives a physical block number which has the largest number of "DATA INVALID" sectors. The file system control section 2 also accesses the block information table 10 to obtain a logical block number that corresponds to the obtained physical block number (Step 151).

The file system control section 2 accesses the flash memory section 5 via the flash memory control section 4, and changes the logical block number of the block control sector 52a of the reserve erasure block 51 that has been secured in advance for use in the reconstruction of the file system 1 to the logic block number obtained at Step 151, and changes the block state of the block control sector 52a from "UNUSED" to "RECEIVING DATA". Similarly, the file system control section 2 accesses the block information table 10, changes the logical block number of the reserve erasure block 51 to the logical block number obtained at Step 151, and changes the block state from "UNUSED" to "RECEIVING DATA" (Step 152).

Next, in order to efficiently copy data from the erasure block 51 having the physical block number obtained at Step 151 to the reserve erasure block 51, the file system control section 2 accesses the sector information table 11, and searches for and obtains a physical sector number which has the "DATA VALID" sector state, among the physical sector numbers corresponding to the physical block number obtained at Step 151 (Step 153).

If a sector 52 exists which has the "DATA VALID" sector state (following the "YES" path from Step 154), the file system control section 2 accesses the flash memory section 5 via the flash memory control section 4, and copies a "DATA VALID" sector state within the block control sector 52a of the erasure block 51 that corresponds to the physical block number obtained at Step 151 and to the physical sector number obtained at Step 153, to a sector state within the block control sector 52a of the reserve erasure block 51 that corresponds to the same physical sector number. Similarly, the file system control section 2 accesses the sector information table 11, and copies the "DATA VALID" sector state that corresponds to the physical block number obtained at Step 151 and to the physical sector number obtained at Step 153, to the sector state of the same physical sector number within the reserve erasure block 51. At the same time, the file system control section 2 accesses the flash memory section 5 via the flash memory control section 4, and copies data from the sector 52 within the erasure block 51 that corresponds to the physical block number obtained at Step 151 and to the physical sector number obtained at Step 153, to the sector 52 having the same physical sector number within the reserve erasure block 51 (Step 155).

Next (or following the "NO" path from Step 154), the file system control section 2 confirms whether or not an unprocessed sector 52 exists in the erasure block 51 having the physical block number obtained at Step 151 (Step 156). If an unprocessed sector 52 exists (following the "YES" path from Step 156), the control returns to Step 153. If no unprocessed sector 52 exists (following the "NO" path from Step 156), the data copying has been completed.

Accordingly, referring to FIG. 29, the file system control section 2 accesses the sector information table 12, and copies the number of "DATA VALID" sectors corresponding to the physical block number obtained at Step 151 to the number of "DATA VALID" sectors in the reserve erasure block 51. The file system control section 2 sets the number of "DATA INVALID" sectors to 0. The file system control section 2 calculates and sets the number of "UNUSED" sectors so that the sum of the number of "DATA VALID" sectors, the number of "DATA INVALID" sectors, and the number of "UNUSED" sectors equals the total number of sectors (i.e., 127) (Step 157).

Next, the file system control section 2 accesses the flash memory section 5 via the flash memory control section 4, and changes the block state of the block control sector 52a of the reserve erasure block 51 from "RECEIVING DATA" to "ERASING ORIGINAL BLOCK" (Step 158);

Then, the file system control section 2 erases the data in the erasure block 51 having the physical block number obtained at Step 151 (Step 159); and then changes the block state of the block control sector 52a of the reserve erasure block 51 from "ERASING ORIGINAL BLOCK" to "INCLUDES DATA".

Similarly, the file system control section 2 accesses the block information table 10, and changes the block state of the block control sector 52a of the reserve erasure block 51 from "RECEIVING DATA" to "ERASING ORIGINAL BLOCK" (Step 158), and after the data erasure at Step 159, changes the block state of the reserve erasure block 51 from "ERASING ORIGINAL BLOCK" to "INCLUDES DATA".

Thus, the block having the physical block number obtained at Step 151, i.e., the block whose data has been erased, is secured as a new reserve erasure block 51 (Step 160).

At this time, the block state of the block control sector 52a of the erasure block 51 whose data was erased at Step 159 automatically changes from "INCLUDES DATA" or "DATA FULL" to "UNUSED" through the data erasure. In the block information table 10, the sector information table 11, and the sector information table 12, the erasure block 51 whose data was erased at Step 159 appears as a reserve erasure block. Since the reserve erasure block 51 will not be referred to during a data write operation for the flash memory section 5, the items corresponding to the physical block number of the reserve erasure block 51 do not need to be changed.

In the above conventional data management system, when attempting to store a group of data into consecutive unused address regions in erasure blocks (typically, one erasure block has a size of 64 kilobytes or 8 kilobytes), the data sometimes cannot be successfully stored over a plurality of erasure blocks. For example, when attempting to store data of 5 kilobytes, if the amount an unused space in each erasure block is smaller than 5 kilobytes, the data cannot be stored even in the case where the total size of distributed unused spaces is 5 kilobytes or more. Moreover, when the size of an erasure block is 64 kilobytes, data greater than 64 kilobytes cannot be stored.

In a conventional data storage method where data having a greater size than that of an erasure block is divided and stored in a plurality of erasure blocks in a distributed manner, information about immediately-previous and immediately-subsequent data storage sites is added to each data as link information. The data having a greater size than that of an erasure block is stored over a plurality of erasure blocks while following the link information. In this case, if many groups of data having a relatively small size (smaller than the size of a block) are processed in units of a block, many small memory spaces where no data is contained are left unused in the blocks, and accordingly, the efficiency of storage in the memory region becomes significantly low. Thus, in view of the above-described disadvantages of flash memories, in order to use a flash memory in a disk drive, such as a hard disk drive, it is necessary to decrease the units in which data is processed to about several hundreds of bytes, which are the units in which data is processed in many hard disk drives.

SUMMARY OF THE INVENTION

A data management system of the present invention includes: a nonvolatile semiconductor storage section including a plurality of blocks capable of storing data, the data being erasable in units of a block; a storage control section for controlling a storage operation of the nonvolatile semiconductor storage section; a data management system control section for processing data to be stored in the nonvolatile semiconductor storage section; and a data management system memory section for storing management data which is referred to by the data management system control section, wherein the data management system control section performs data management by: dividing the data into data segments in units of a sector which is a logical unit for data management; storing data link information which indicates the ordinal relationship of the data segments, together with the data segments, in the nonvolatile semiconductor storage section via the storage control section; and storing, as link information in each sector, information about immediately-previous and immediately-subsequent data storage sites, whereby an objective of the present invention is achieved. A data management method of the present invention includes a step of storing in a nonvolatile semiconductor storage section, together with each of the data segments that are distributed to sectors each of which is a logical data management unit, data link information indicating an ordinal relationship of the data segments based on which the data segments are distributed to the sectors and having information on immediately-previous and immediately-subsequent data storage sites for each of the data segments distributed to the sectors, whereby an objective of the present invention is achieved.

With such a structure, data to be stored is divided into data segments having a uniform small size. The data segments are interrelated by adding, to each data segment, data link information containing information about immediately-previous and immediately-subsequent data storage sites. With such an arrangement, any size of data can be efficiently stored over the entire data storage region without securing physically-consecutive unused address regions. Thus, the above-described problem that data cannot be stored even though there is sufficient total memory area that can store the data, can be avoided.

In a preferred embodiment of the data management system of the present invention, the data link information has number information for logical management which is allocated by the data management system control section to the block. The number information preferably includes at least a logical block number and a logical sector number.

With such a structure, logical numbers, such as logical block numbers and logical sector numbers, are used as data link information, and therefore, it is not necessary to rewrite the number of a site where data is stored even when the physical position of the data is changed.

In a preferred embodiment of the data management system of the present invention, the data link information has number information for physical management which is allocated by the data management system control section to the block. The number information preferably includes at least a physical block number and a physical sector number.

With such a structure, physical numbers, such as logical block numbers and physical sector numbers, are used as data link information, and therefore, it is not necessary to convert a logical number to a physical number. Thus, desired data can be specified at a high rate.

In a preferred embodiment of the data management system of the present invention, the data link information includes: data where all the bits are in a bit state that indicates that a block is erased, as information about the immediately-previous data storage site for a leading data segment of the distributed data segments; and data where all the bits are in a bit state that indicates that a block is erased, as information about the immediately-subsequent data storage site for a last data segment of the distributed data segments.

With such a structure, data where all the bits are 1 (which is the bit state when a block is erased) is stored, as information about an immediately-previous data storage site, in a sector containing the leading data segment among distributed data segments, or is stored, as information about an immediately-subsequent data storage site, in a sector containing the last data segment among distributed data segments. With such an arrangement, the sector is readily identified as being at the head or tail of the stored data. Since the data where all the bits are 1 represents the erased state, an error in the stored data can be readily found.

In a preferred embodiment of the data management system of the present invention, the data link information further includes an error-correcting code for error-correcting the information about the immediately-previous data storage site and the information about the immediately-subsequent data storage site. The error-correcting code is preferably a Hamming code.

With such a structure, information about immediately-previous and immediately-subsequent data storage sites are stored as data link information by using an error-correcting code, such as a Hamming code. Thus, the link information has a structure resistant to breakage.

In an preferred embodiment of the data management system of the present invention, the data management system control section manages correspondence between an ID number supplied by software, such as an application program or operating system, and a leading data segment of the distributed data segments such that data stored in the nonvolatile semiconductor storage section can be identified by the ID number.

With such a structure, data is identified by ID numbers, and a relationship between the ID numbers and leading addresses where the data is stored is managed in an RAM region. Thus, a Leading address of a data storage site can be found at a high rate.

In a preferred embodiment of the data management system of the present invention, the data link information includes a plurality of data link information having the same content.

With such a structure, the data link information includes two link information having the same content (for example, original link information and spare link information). With such a structure, even when an error is caused in one of the link information during a data read operation, data can be correctly read out.

In a preferred embodiment of the data management system of the present invention, the data management system control section includes: a section for searching a leading sector of data corresponding to an ID number supplied by the application program or operating system and comparing information about an immediately-previous data storage site of data link information stored in the leading sector with data where all the bits indicate a state where a block is erased, and a section for informing, when the comparison result is negative, software such as an application program or an operating system that there is an error in the data link information. In a preferred embodiment of the data management system of the present invention, the data management system control section includes: a section for searching a leading sector of data corresponding to an ID number supplied by software, such as the application program or operating system, and when the last sector is referred to while sequentially following, from the leading sector, information about immediately subsequent data storage site included in data link information stored in each sector, comparing information about an immediately-subsequent data storage site of data link information stored in the last sector with data where all the bits indicate a state where a block is erased; and a section for informing, when the comparison result is negative, software such as an application program or an operating system that there is an error in the data link information. In a preferred embodiment, the data management method of the present invention further includes steps of: searching a leading sector of data corresponding to an ID number supplied by the application program or operating system and comparing information about an immediately-previous data storage site of data link information stored in the leading sector with data where all the bits indicate the state that a block is erased; and informing, when the comparison result is negative, software such as an application program or an operating system that there is an error in the data link information. In a preferred embodiment, the data management method of the present invention further includes steps of: searching a leading sector of data corresponding to an ID number supplied by software, such as the application program or operating system, and when the last sector is referred to while sequentially following, from the leading sector, information about immediately subsequent data storage site included in data link information stored in each sector, comparing information about an immediately-subsequent data storage site of data link information stored in the last sector with data where all the bits indicate the state that a block is erased; and informing, when the comparison result is negative, software such as an application program or an operating system that there is an error in the data link information.

With such a structure, it is checked whether or not information about: an immediately-previous or immediately-subsequent data storage site, which is stored in the leading or last sector among the sectors where a group of data is stored, is data where all the bits are 1. Thus, it can be readily and accurately determined whether or not the data link information of the leading or last sector is correct.

In a preferred embodiment of the data management system of the present invention, the data management system control section includes a section for confirming for at least each distributed data segment, when the data link information is referred to, whether or not any discrepancy exists between information about an immediately-subsequent data storage site which is stored in each sector and information about an immediately-previous data storage site which is stored in a next sector appointed by the information about the immediately-subsequent data storage site. In a preferred embodiment, the data management method of the present invention further includes a step of confirming for at least each distributed data segment, when the data link information is referred to, whether or not any discrepancy exists between information about an immediately-subsequent data storage site which is stored in each sector and information about an immediately-previous data storage site which is stored in a next sector appointed by the information about the immediately-subsequent data storage site.

With such a structure, when the data link information includes a plurality of link information having the same content (for example, original link information and spare link information), at least during a data read operation, it is confirmed whether or not any discrepancy exists in the original information, and in addition, it is confirmed whether or not any discrepancy exists in the spare information. Thus, an error in the link information can be readily found.

In a preferred embodiment of the data management system of the present invention, the data management system control section includes a section for confirming for each distributed data segment, by using each pair of data link information, when at least the data link information is referred to, whether or not any discrepancy exists between information about an immediately-subsequent data storage site which is stored in each sector and information about an immediately-previous data storage site which is stored in a next sector appointed by the information about the immediately-subsequent data storage site. In a preferred embodiment, the data management method of the present invention further includes a step of confirming for each distributed data segment, by using each pair of data link information, when at least the data link information is referred to, whether or not any discrepancy exists between information about an immediately-subsequent data storage site which is stored in each sector and information about an immediately-previous data storage site which is stored in a next sector appointed by the information about the immediately-subsequent data storage site.

With such a structure, when the data link information includes a plurality of link information having the same content (for example, original link information and spare link information), at least during a data read operation, it is confirmed whether or not any discrepancy exists in the original information, it is confirmed whether or not any discrepancy exists in the spare information, and in addition, it is confirmed whether or not any discrepancy exists between the original information and the spare information. Thus, the link information has a structure resistant to breakage.

In a preferred embodiment of the data management system of the present invention, the data management system control section includes a section for: confirming, when one of the plurality of link information having the same content is referred to, by using a pair of data link information, whether or not any discrepancy exists between information about an immediately-subsequent data storage site which is stored in each of distributed sectors and information about an immediately-previous data storage site which is stored in a next sector appointed by the information about the immediately-subsequent data storage site; and performing the confirmation by using another pair of data link information if any discrepancy exists. In a preferred embodiment, the data management method of the present invention further includes steps of: confirming, when one of the plurality of link information having the same content is referred to, by using a pair of data link information, whether or not any discrepancy exists between information about an immediately-subsequent data storage site which is stored in each of distributed sectors and information, about an immediately-previous data storage site which is stored in a next sector appointed by the information about the immediately-subsequent data storage site; and performing the confirmation by using another pair of data link information if any discrepancy exists.

With such a structure, the data link information includes a plurality of Link information. Thus, even if any discrepancy exists in some of the plurality of link information, data can be read by using link information having no discrepancy. Therefore, the link information has a structure resistant to breakage.

In a preferred embodiment of the data management system of the present invention, the data management system control section includes a section for: referring, for the purpose of confirming whether or not any discrepancy exists between information concerning data storage sites, to data appointed by information about an immediately-subsequent data storage site which is included in data link information of one of the distributed data segments; and comparing information about an immediately-previous data storage site of data link information stored in an immediately-subsequent sector with information about an immediately-previous data storage site. In a preferred embodiment of the present invention, the data management method further includes steps of: referring, for—the purpose of confirming whether or not any discrepancy-exists between information concerning data storage sites, data appointed by information about an immediately-subsequent data storage site which is included in data link information of one of the distributed data segments; and comparing information about an immediately-previous data storage site of data link information stored in an immediately-subsequent sector with information about an immediately-previous data storage site.

With such a structure, whether or not any discrepancy exists in the data link information can be readily confirmed by comparing link information between two consecutive sectors.

In a preferred embodiment of the data management system of the present invention, the data management system control section includes a section for correcting information about a data storage site to correct information by using an error-correcting code when any discrepancy exists between the information about data storage sites. In a preferred embodiment of the present invention, the data management method further includes a step of correcting information about a data storage site to correct information by using an error-correcting code when any discrepancy exists between the information about data storage sites.

With such a structure, when any discrepancy exists in link information, the link information can be corrected to correct link information by using an error-correcting code.

In a preferred embodiment of the data management system of the present invention, the data management system control section includes a section for correcting a plurality of data link information having the same content when the content involves any discrepancy, such that data involving the discrepancy is corrected by using data involving no discrepancy. In a preferred embodiment of the present invention, the data management method further includes a step of correcting a plurality of data link information having the same content when the content involves any discrepancy, such that data involving the discrepancy is corrected by using data involving no discrepancy.

With such a structure, when any discrepancy is caused in link information, the link information can be corrected by using another link information having no discrepancy. Thus, the reliability of a system can be improved.

In a preferred embodiment of the data management system of the present invention, the data management system control section includes a section for informing software, such as an application program, operating system, etc., when a plurality of data link information having the same content have any discrepancy in the content. In a preferred embodiment of the present invention, the data management method further includes a step of informing software, such as application program, operating system, etc., when a plurality of data link information having the same content have any discrepancy in the content.

With such a structure, when any discrepancy is caused in link information, an error message is sent to an application. In response to the message, the application can detect and correct an error caused in the link information.

Thus, the invention described herein makes possible the advantages of providing a data management system and data management method where data divided in units of a sector is stored together with data link information in a plurality of separately distributed sectors of a data storage region, so that the data storage region can be more efficiently utilized.

These and other advantages of the present invention will become apparent to those skilled in the art upon reading and understanding the following detailed description with reference to the accompanying figures.

BRIEF DESCRIPTION OF THE DRAWINGS

FIG. 3 is a diagram showing an exemplary structure of an ID management table stored in a data management system memory section of the data management system shown in FIG. 1.

FIG. 21 is a diagram showing a block information table containing information concerning erasure blocks stored in the file system memory section of FIG. 19 and in the present invention.

FIG. 22 is a diagram showing a sector information table containing information concerning physical sectors stored in the file system memory section of FIG. 19 and in the present invention.

FIG. 23 is a diagram illustrating a sector information table which shows the number of physical sectors for each sector state within each erasure block stored in the file system memory section of FIG. 19 and in the present invention.

DESCRIPTION OF THE PREFERRED EMBODIMENTS

Hereinafter, a data management apparatus according to an embodiment of the present invention, and a data management method using this apparatus will be described with reference to the drawings.

Figure 1:
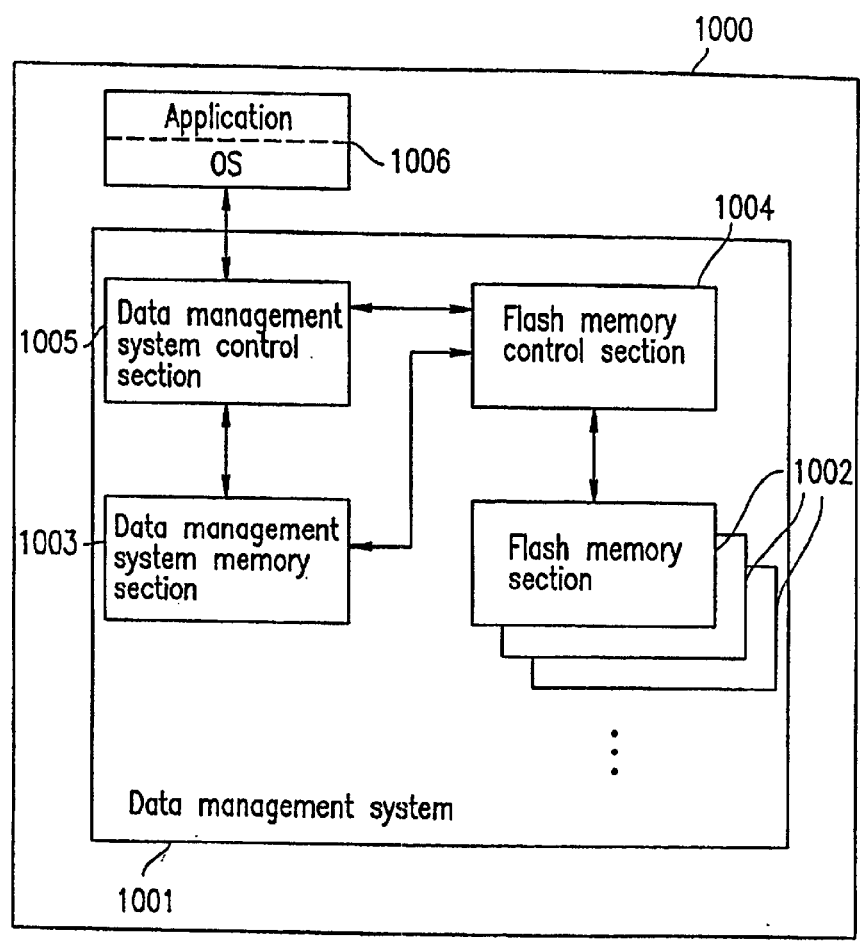
FIG. 1 is a block diagram showing a structure of a data management system according to an embodiment of the present invention.

FIG. 1 is a block diagram showing a structure of a data management apparatus according to an embodiment of the present invention. In FIG. 1, a data management system 1001 includes: a flash memory section 1002 as a nonvolatile semiconductor storage section for data storage; a data management system memory section 1003 for data management; a flash memory control section 1004 as a storage control section for controlling a storage operation in the flash memory section 1002; and a data management system control section 1005 for controlling data processing while performing data management. The data management apparatus 1000 includes the data management system 1001 and an application or operating system (OS) 1006. In the data management apparatus 1000, the software application or operating system (OS) 1006 (software section) requests the data management system 1001 to perform various data processing (for example, read processing, write processing, etc.).

Figure 2:
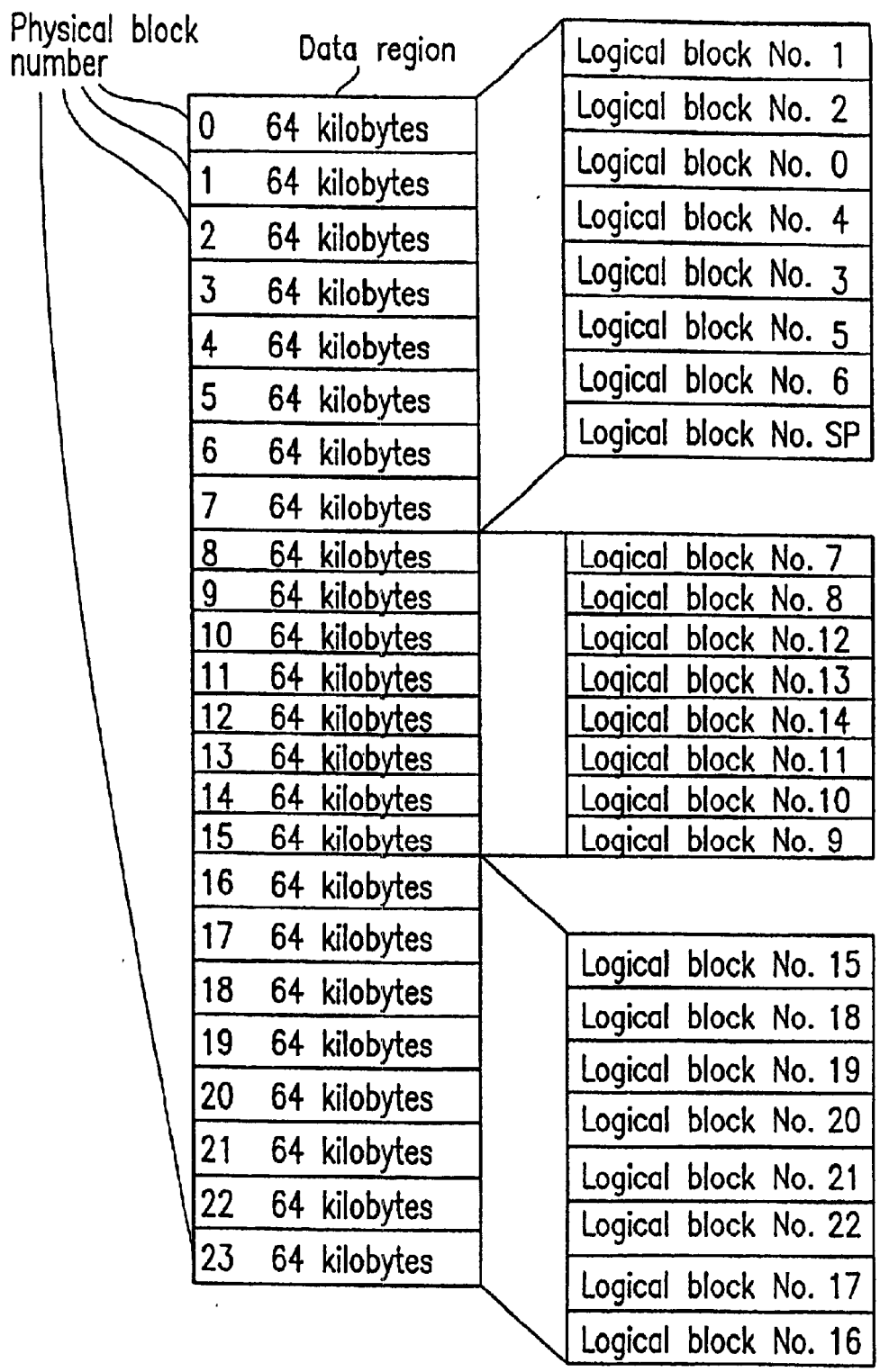
FIG. 2 is a diagram showing an internal structure of a flash memory section of the data management system shown in FIG. 1.

The flash memory section 1002 includes a plurality of flash memories where physical blocks have different sizes, or sectors included in the physical blocks have different sizes. FIG. 2 shows an example of an internal structure of the flash memory section 1002.

As shown in FIG. 2, physical block numbers 0–23 (number information) are assigned to erasure blocks. The physical block numbers 0–23 uniquely correspond to system memory address spaces. Thus, by determining one of the physical block numbers 0–23, a corresponding system memory address (physical address) is determined accordingly. When the data management system 1001 is used for the first time, logical block numbers are assigned to the erasure blocks such that any two blocks do not have the same logical block number as shown in FIG. 2. In the assignation of the logical block numbers, in the example illustrated in FIG. 2, logical block number SP is assigned to the block of physical block number 7, and this block is used as a reserve block in a reconstruction operation. The physical block numbers 0–23 are determined during a system compile operation and are never changed after that. When a reconstruction operation is performed in a block, the logical block number of the block is switched with logical block number SP indicating the reserve block.

The data structure according to the present invention is further described with reference to FIG. 20, which was used when explaining the conventional example.

Figure 20:
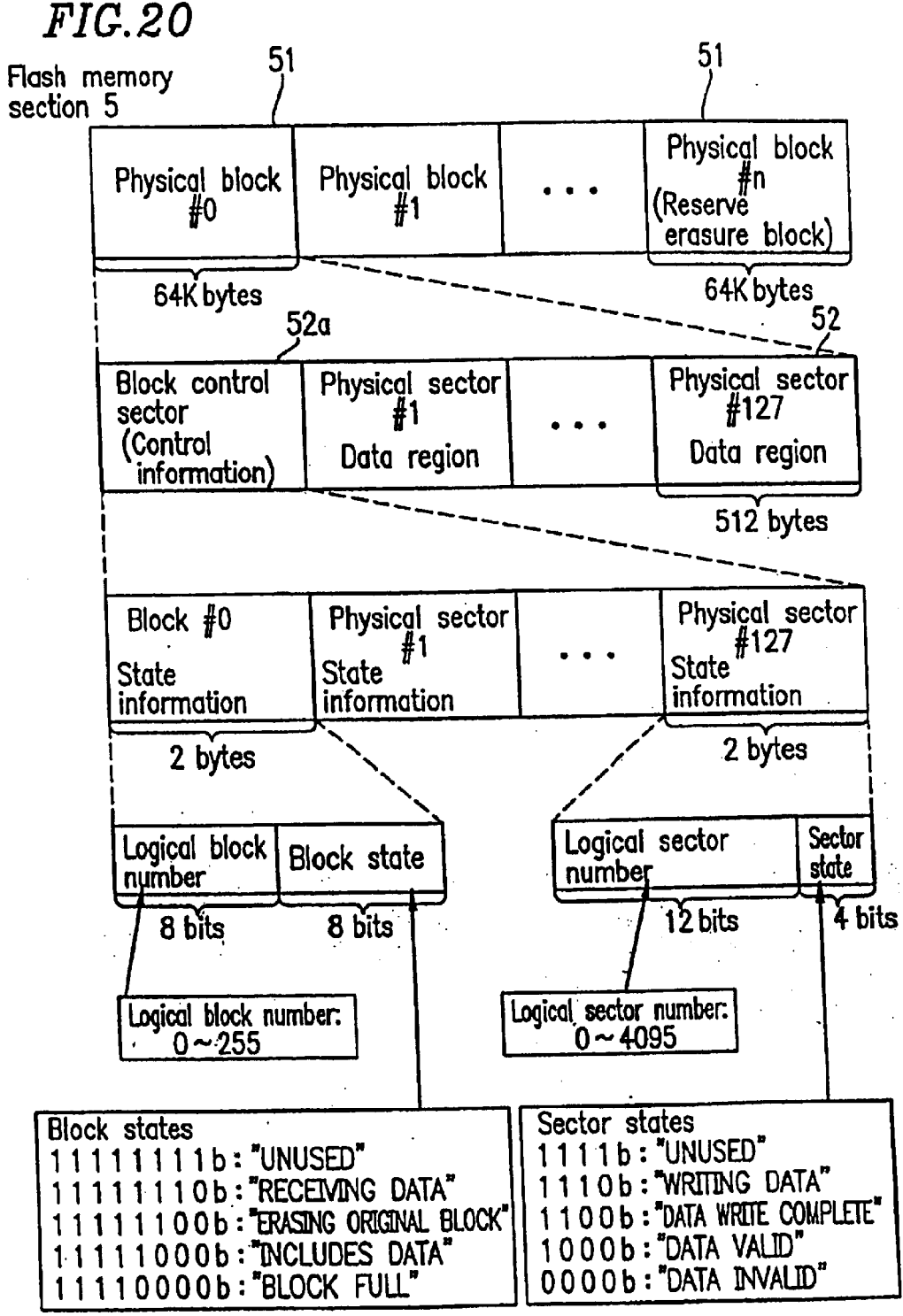
FIG. 20 is a data structure diagram showing the data structure stored in a flash memory section of the file system shown in FIG. 19 and in the present invention.
Figure 24:
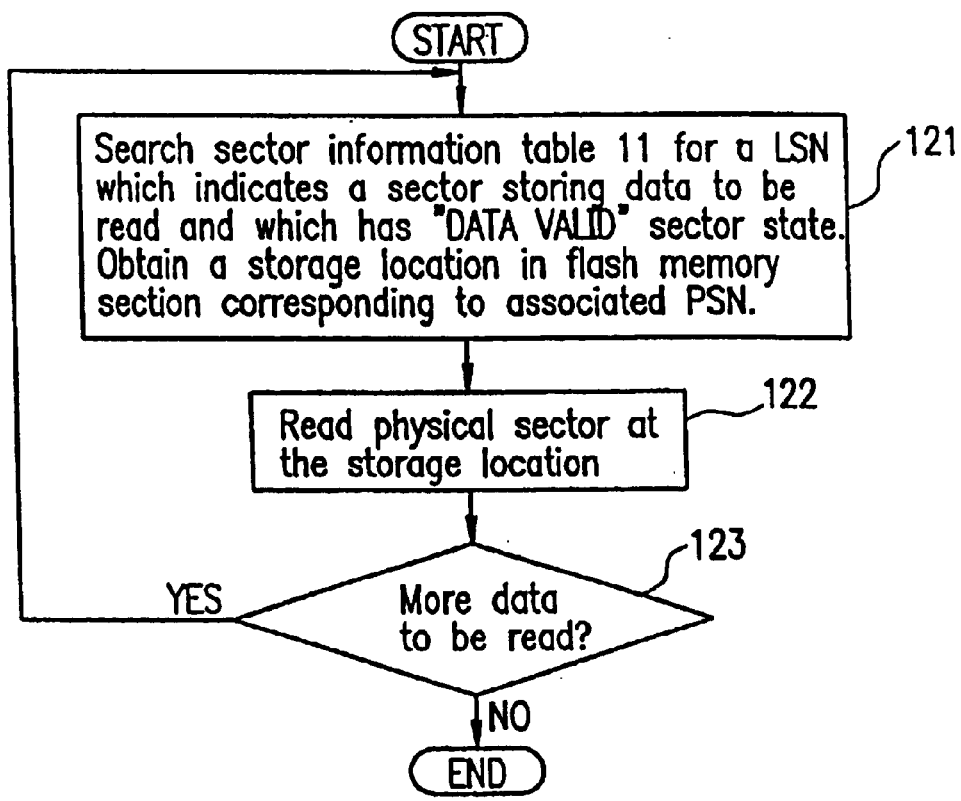
FIG. 24 is a flowchart illustrating a data read operation for data which is stored in the flash memory section according to a conventional technique.
Figure 25:
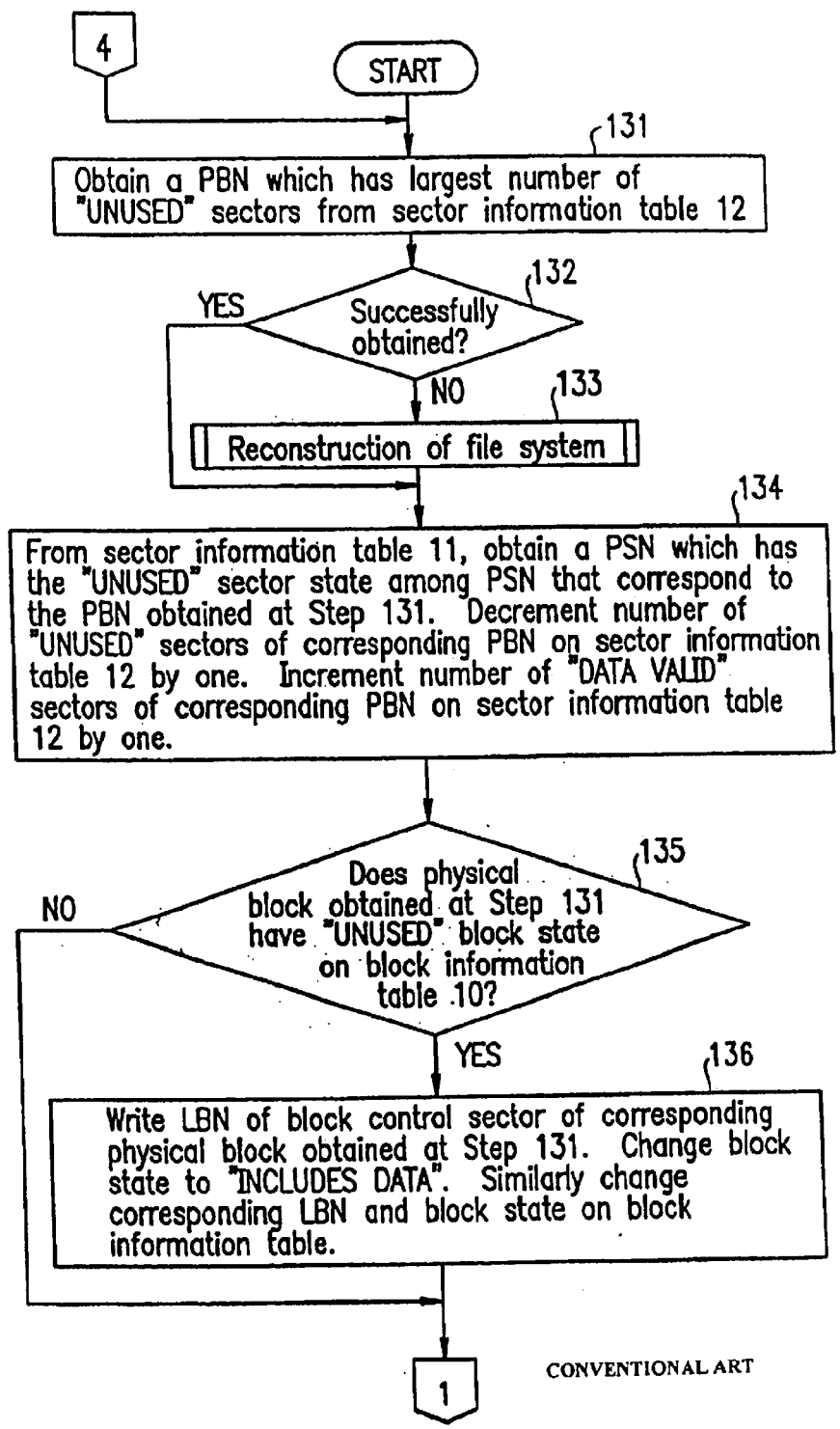
FIGS. 25 through 27 are consecutive flowcharts illustrating a data write operation for writing data to the flash memory section according to a conventional technique.
Figure 26:
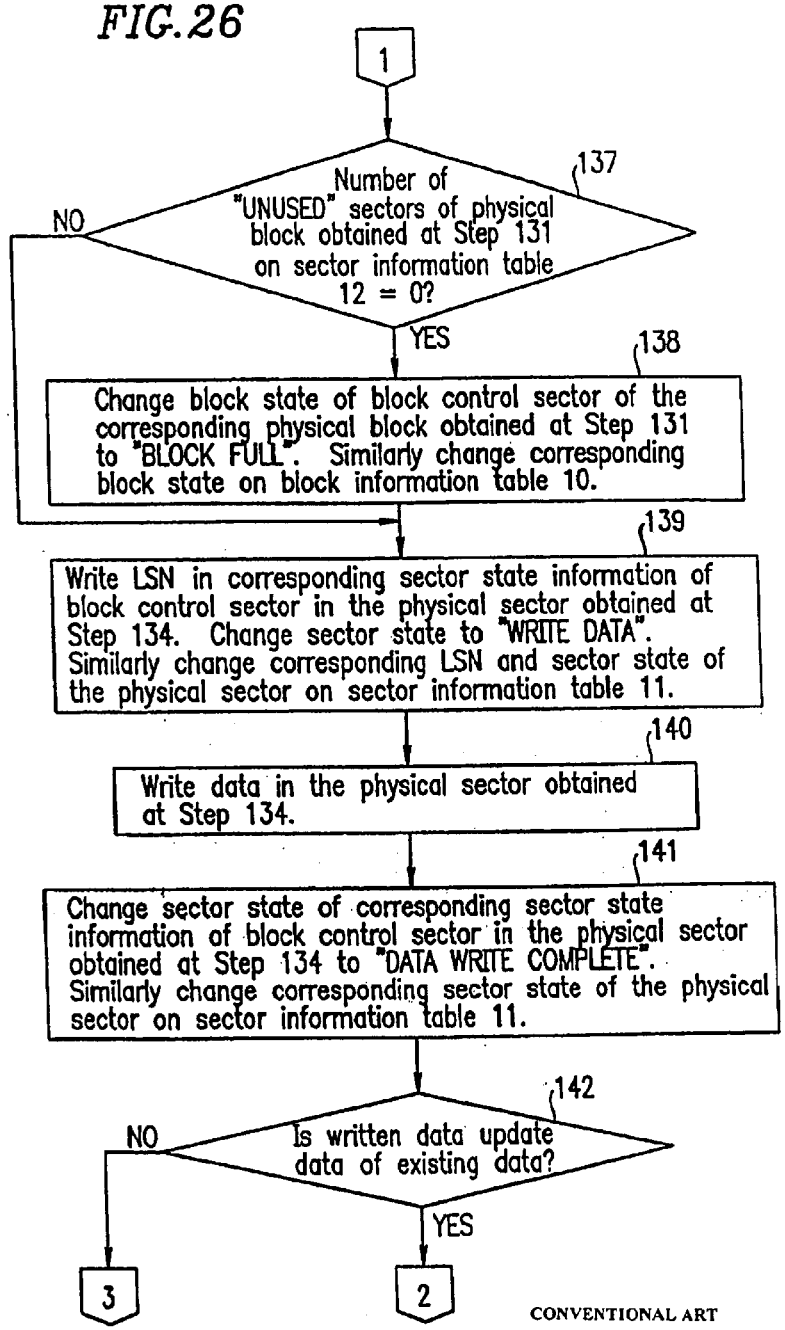
Figure 27:
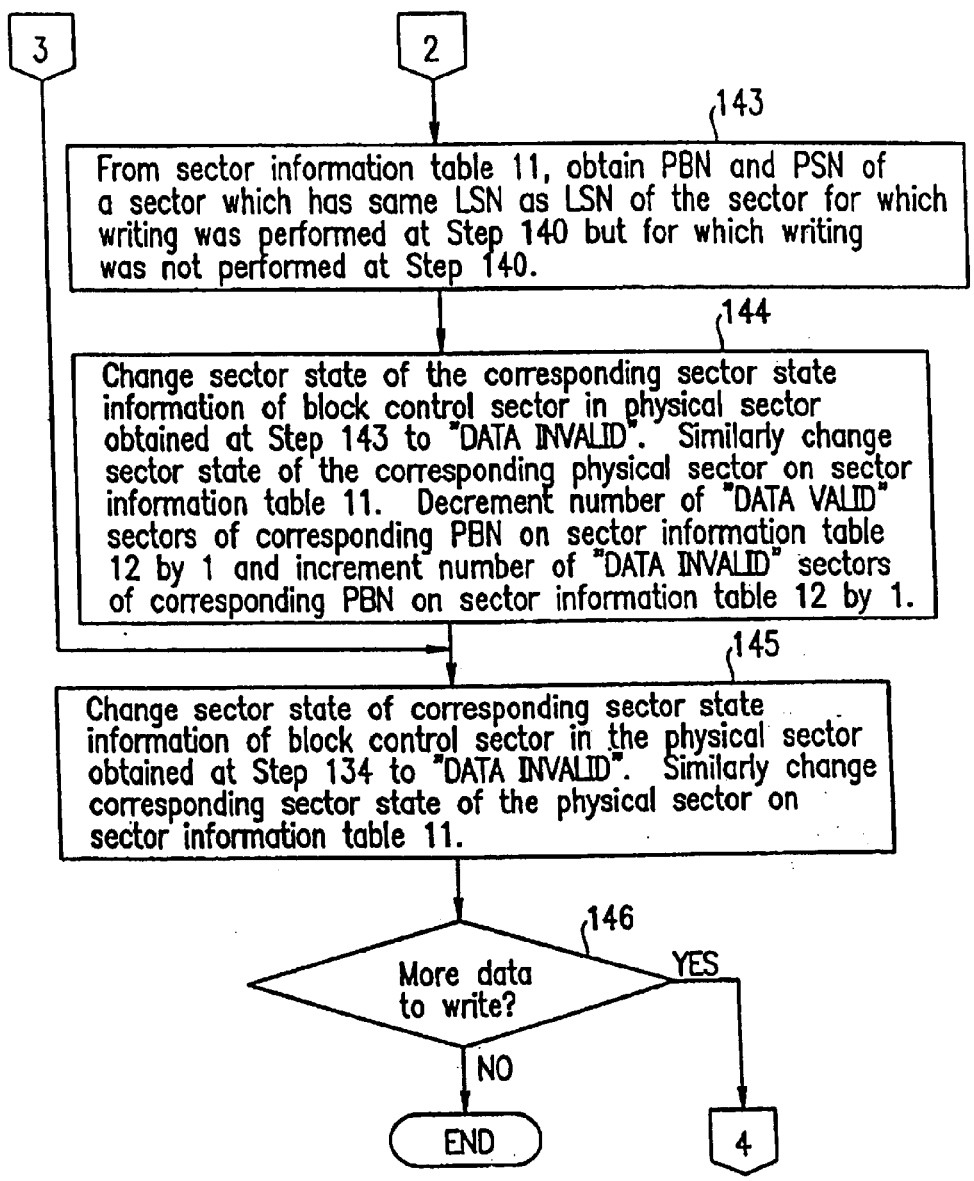
Figure 28:
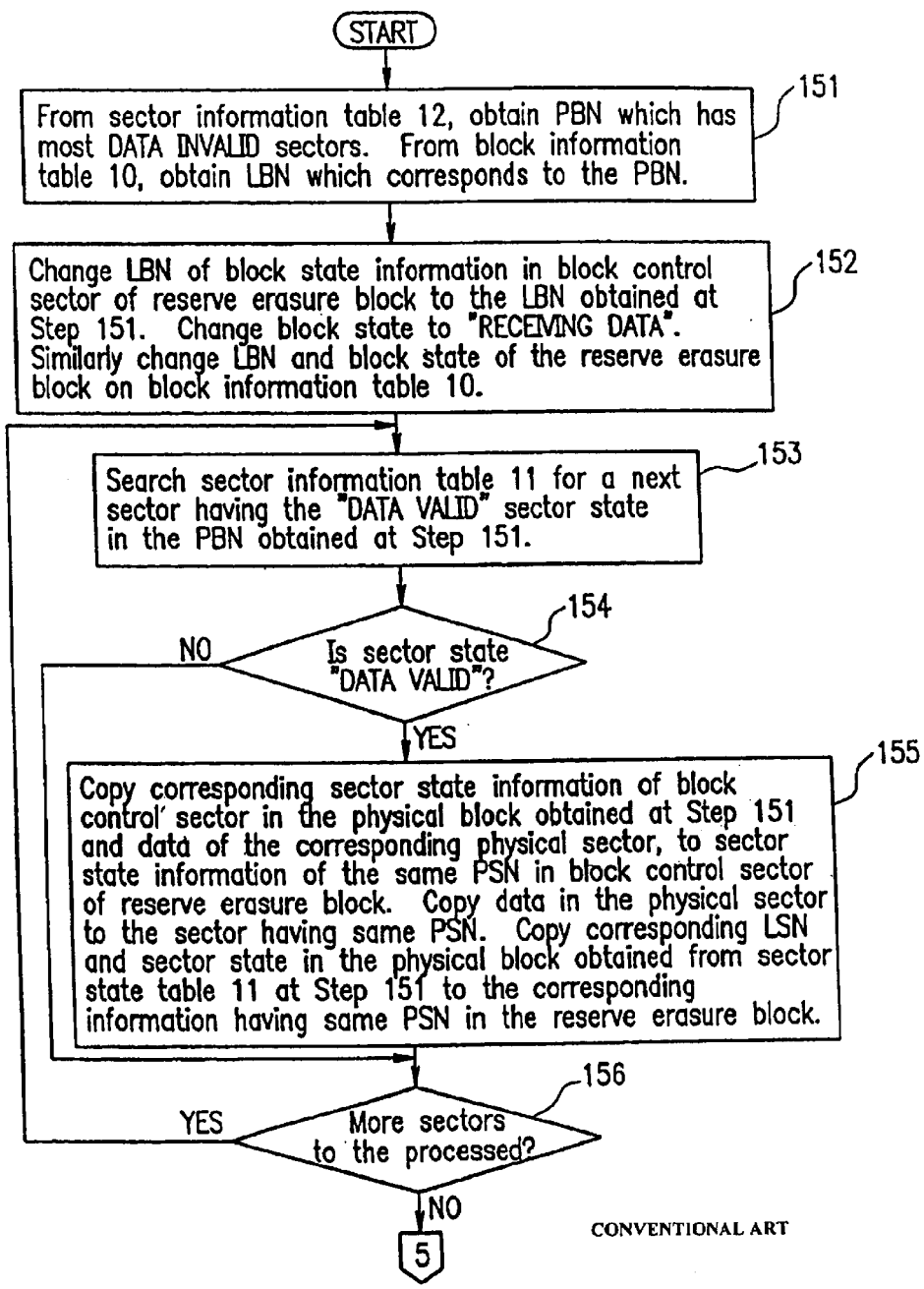
FIGS. 28 and 29 are consecutive flowcharts illustrating a reconstruction process for the file system shown in FIG. 25.
Figure 29:
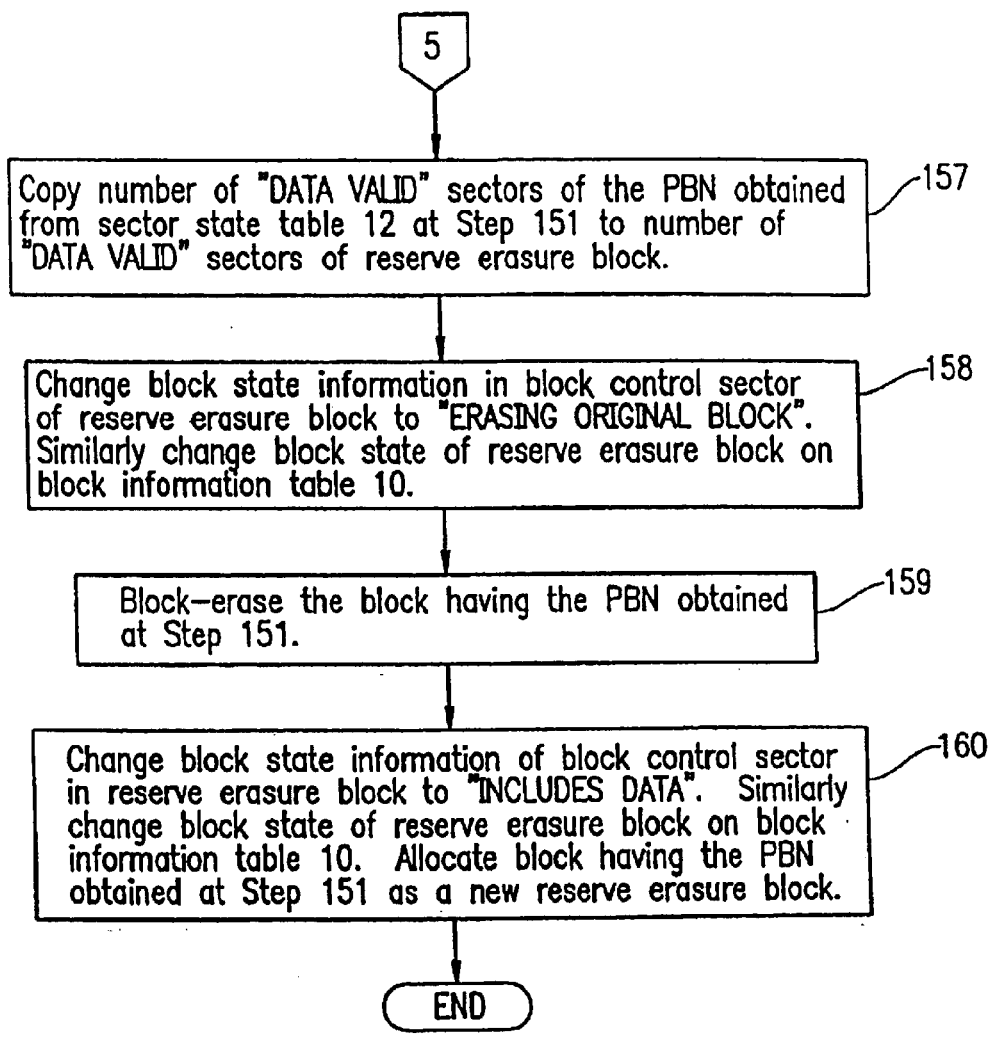

FIG. 20 is also an exemplary data structure diagram showing the data structure stored in the flash memory section 1002. The flash memory section 1002 includes blocks or "erasure blocks" 51. Each erasure block 51 is divided into a plurality of physical sectors 52 (which are the units by which data is processed). Each physical sector 52 within each erasure block 51 has a unique physical sector number. If each erasure block 51 is 64 Kbytes in size and each physical sector 52 is 512 bytes in size, then each erasure block 51 includes 128 physical sectors 52. Note that the sector size is not limited to 512 bytes. The present invention is applicable even when the sector size is, for example, 256 bytes, 1024 bytes, or the like.

In the block control sector 52a of each erasure block 51, 2 bytes of state information concerning the erasure block 51, 2 bytes of state information concerning the physical sector (#1) 52, 2 bytes of state information concerning the physical sector (#2) 52, ... 2 bytes of state information concerning the physical sector (#127) 52 are sequentially provided. Thus, the block control sector 52a contains 2 bytes.times. 128=256 bytes of information.

The state information concerning the erasure block 51 includes a logical block number (one of 0 to 255) as assigned by the data management system control section 1005 and data which represents one of the five following block states: (1) "111111111b" representing "UNUSED"; (2) "111111110b" representing "RECEIVING DATA"; (3) "11111100b" representing "ERASING ORIGINAL BLOCK"; (4) "11111000" representing "INCLUDES DATA"; or (5) "11110000b" representing "BLOCK FULL". The label "b" at the end of each bit string indicates "binary".

Similarly to the state information of the erasure block 51, the state information of each sector 52 of the erasure block 51 includes: a logical sector number (0 to 4095) which is uniquely assigned within the system by the data management system control section 1005; and data which represents one of the following five sector states: (I) "1111b" representing "UNUSED"; (II) "1110b" representing "WRITING DATA"; (III) "1100b" representing "DATA WRITE COMPLETE"; SHIV) "1000b" representing "DATA VALID"; or (V) "0000b" representing "DATA INVALID".

The data management system memory section 1003 is used for storing control information (management data) for controlling the data management system 1001. This control information (management data) may be, for example, an ID management table shown in FIG. 3, the block information table 10 shown in FIG. 21, the sector information table 11 shown in FIG. 22, the sector information table 12 shown in FIG. 23, or the like.

FIG. 3 shows an exemplary structure of the ID management table. As shown in FIG. 3, the ID management table includes: an ID number for uniquely identifying data stored in the flash memory section 1002; a logical block number which indicates a block containing leading information of data stored over a plurality of blocks; a logical sector number within a block in which the leading information of the data is stored; and data size information. In the example illustrated in FIG. 3, leading information of data with ID number=10 and size=200 bytes is stored in a site identified by logical block number=2 and logical sector number=3. In an alternative example of a table structure, the data size information may not be stored in the ID management table (in a RAM) for the purpose of decreasing the table size and the system start-up time, because the data size information can be also stored in the head of the data.

The block information table 10 and the sector information tables 11 and 12 are further described with reference to FIGS. 21 through 23, which were used when explaining the conventional example.

FIG. 21 is also a data structure diagram showing a structure of management data concerning each erasure block 51 (hereinafter referred to as the "block information table 10") stored in the data management system memory section 1003 of the file system shown in FIG. 1, which shows the data structure of the respective erasure blocks 51. In the block information table 10 of FIG. 21, each information unit consists of a physical block number, a logical block number, and a block state. Thus, the block information table 10 illustrates an erasure block 51 whose physical block number=0, logical block number=0, and block state= "INCLUDES DATA"; an erasure block 51 whose physical block number=1, logical block number=1, and block state= "BLOCK FULL" (or "DATA FULL"); and so on.

FIG. 22 is also a data structure diagram showing a structure of management data concerning each physical sector 52 (hereinafter referred to as the "sector information table 11") stored in the data management system memory section 1003 of the file system shown in FIG. 1, which shows the data structure of the respective physical sectors 52. In the sector information table 11 of FIG. 22, each information unit consists of a physical block number, a physical sector number, a logical sector number, and a sector state. Thus, the sector information table 11 illustrates a sector 52 whose physical block number=0, physical sector number=1, logical sector number=100, and sector state= "DATA VALID"; a sector 52 whose physical block number=0 physical sector number=2 logical sector number= 10, and sector state="DATA INVALID"; and so on.

FIG. 23 is also a data structure diagram showing a structure of management data (hereinafter referred to as the "sector information table 12") stored in the data management system memory section 1003 of the file system shown in FIG. 1, showing the number of physical sectors 52 for each sector state within each physical block 51. Specifically, the sector information table 12 shows the number of "UNUSED" sectors 52, the number of "DATA VALID" sectors 52, and the number of "DATA INVALID" sectors 52 in each erasure block 51. In the sector information table 12 of FIG. 23, each information unit consists of a physical block number, the number of "UNUSED" sectors, the number of "DATA VALID" sectors, and the number of "DATA INVALID" sectors. Thus, the sector information table 12 illustrates an erasure block 51 whose physical block number=0, number of "UNUSED" sectors=100, number of "DATA VALID" sectors=20, and number of "DATA INVALID" sectors=7; an erasure block 51 whose physical block number=1, number of "UNUSED" sectors=0, number of "DATA VALID" sectors=50, and number of "DATA INVALID" sectors=77; and so on.

The block information table 10 (FIG. 21), the sector information table 11 (FIG. 22), and the sector information table 12 (FIG. 23) are generated by reading the block control sector 52a of each erasure block 51 from the flash memory section 1002 at the time when the data management system 1001 is activated.

It would be possible to use the data management system 1001, in order to specify a site where data to be accessed is stored, without generating the block information table 10, the sector information table 11, and the sector information table 12 because the information of these tables is stored in the block control sector 52a of each erasure block 51. However, when the data management system memory section 1003 is formed of a RAM, for example, the data management system memory section 1003 operates at a faster speed than the flash memory section 1002. Therefore, by storing the generated block information table 10, sector information table 1, and sector information table 12 in the data management system memory section 1003, it becomes possible to quickly grasp the internal state of the flash memory section 1002 and where given data is stored. In addition, the operation speed of the data management system 1001 can be effectively enhanced by utilizing the data management system memory section 1003 because the amount of data exchanged with the flash memory section 1002 is reduced.

In the data management apparatus 1000 (FIG. 1) of this embodiment, at the start-up of the data management system 1001, the data, management system control section 1005 reads out necessary information from the flash memory section 1002 via the flash memory control section 1004 in order to create the block information table 10 and the sector information tables 11 and 12 in the data management system memory section 1003.

Next, the data management system control section 1005 divides data into data segments corresponding to logical sectors each of which is a logically-established data management unit. Link information indicating the sequence order of these data segments is stored together with the data segments in the flash memory section 1002 via the flash memory control section 1004. With such a data management arrangement, data processing can be readily performed. The link information includes information about a data storage site immediately before or immediately after a data segment stored in each sector. The function of the data management system control section 1005 is described below in detail with reference to various specific examples according to the present invention.

Figure 4:
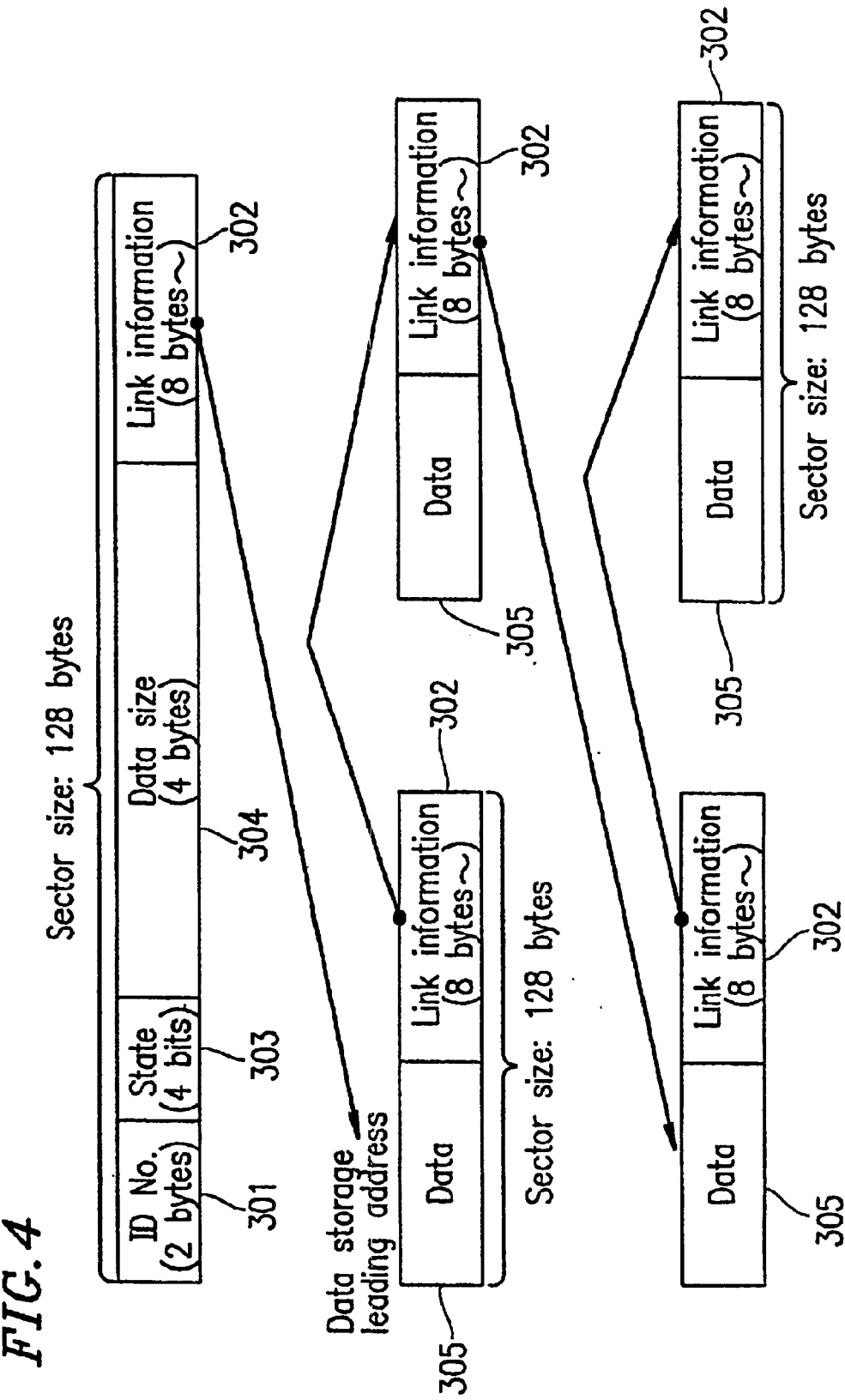
FIG. 4 is a data structure diagram illustrating data storage based on a data link structure of the present invention.
Figure 17:
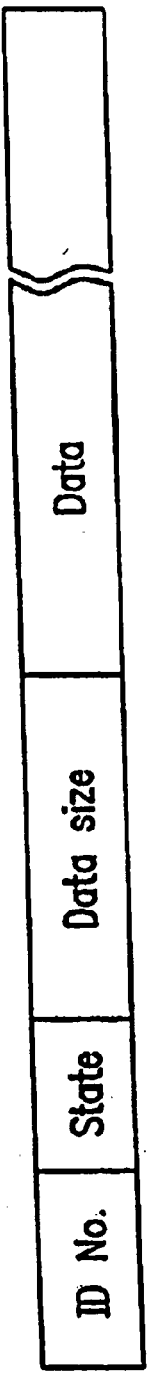
FIG. 17 is a diagram illustrating a state of stored data according to a conventional technique.
Figure 18:
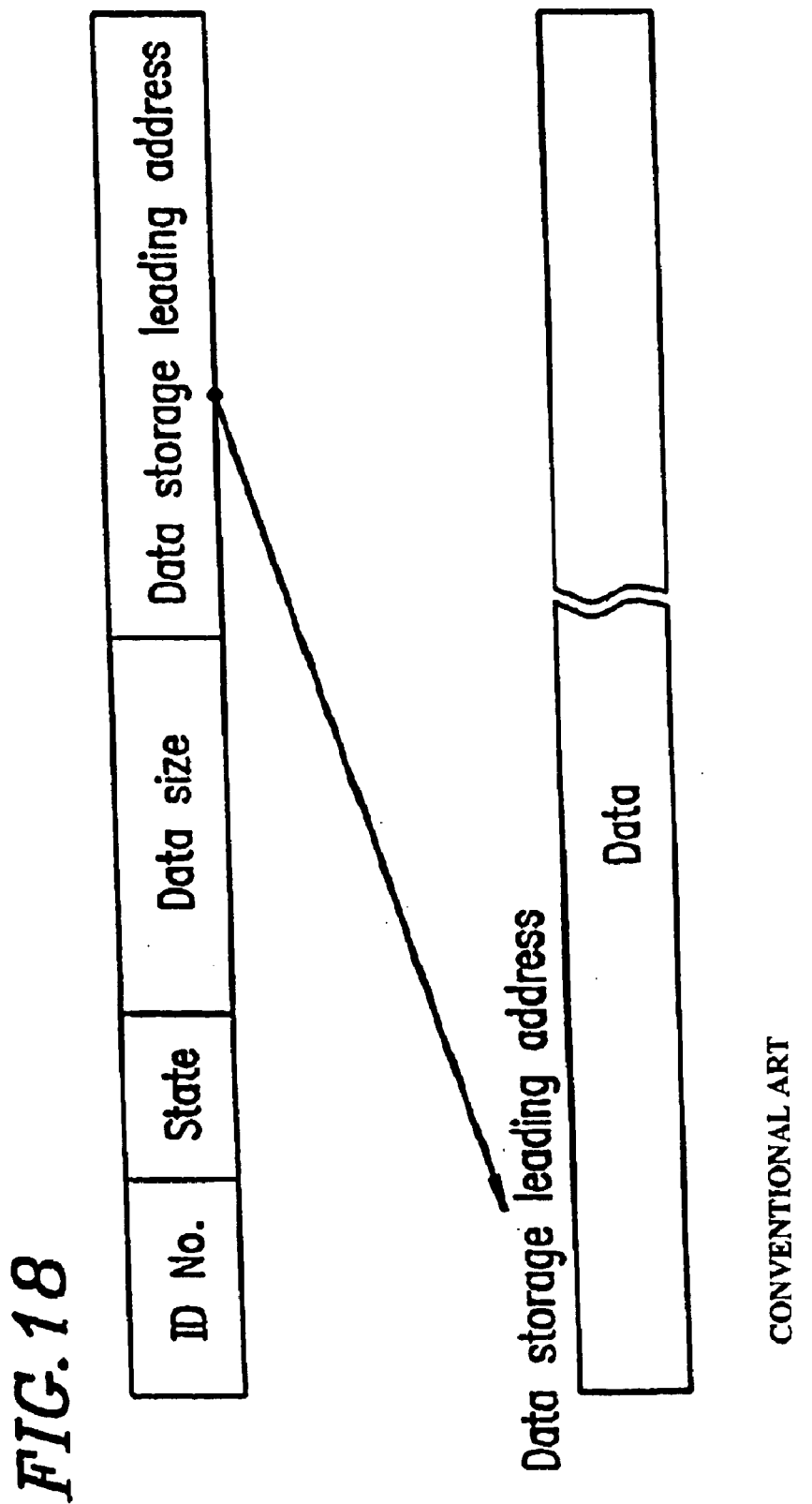
FIG. 18 is a diagram illustrating another example of the state of stored data according to a conventional technique.
Figure 19:
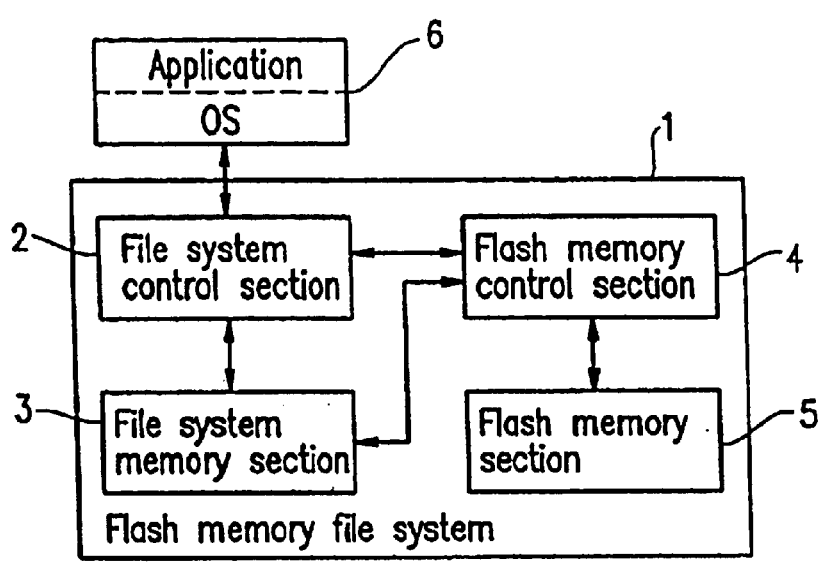
FIG. 19 is a block diagram showing a structure of a file system according to a conventional technique.

FIG. 4 shows a data structure for illustrating a data storage method based on a link structure according to the present invention. As shown in FIG. 4, the data management system control section 1005 stores, for each data, an ID (identification) number 301 which is unique in the system, state information 303 which indicates the state of main data, such as "DATA VALID", "DATA INVALID", etc., data size information 304, and main data, in the flash memory section 1002 via the flash memory control section 1004. As shown in FIG. 4, data information, i.e., "ID No. (301)" and "State (303)", are included in the leading sector of a block (sector shown in the uppermost part of FIG. 4). The following four sectors linked to the leading sector have the same structure containing data (a portion of main data) 305 and link information 302. The difference from the conventional data storage method described in FIGS. 17 and 18 resides in that a group of data is divided in units of a sector which is a logical unit for storage, and divided data (data segment) is stored in each sector together with link information stored at the end of the sector which indicates an address region (sector) where the next data segment is to be stored. With such link information, the entire main data can be serially stored in a logical sense.

Figure 5:
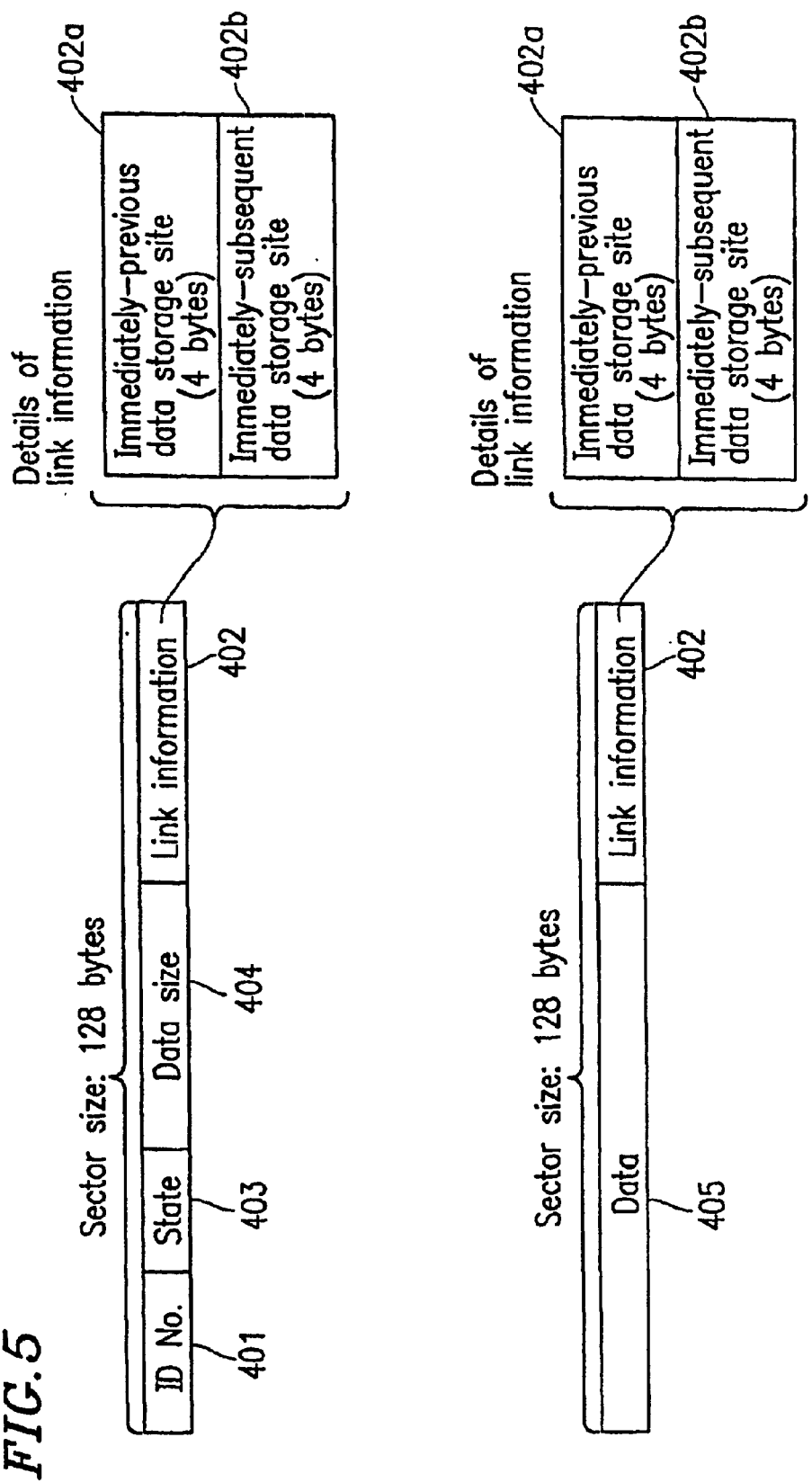
FIG. 5 is a data structure diagram illustrating the details of link information of FIG. 4.

FIG. 5 shows a data structure for illustrating in detail a structure of the link information shown in FIG. 4. In FIG. 5, the link information includes information 402a about an immediately-previous data storage sector (4 bytes) and information 402b about an immediately-subsequent data storage sector (4 bytes) with respect to the current sector. Each of these information 402a and 402b stores a logical block number (2 bytes) and a logical sector number (2 bytes) corresponding to a site where the immediately-previous or immediately-subsequent data storage sector exists. Since the link information 402 contains logical management numbers (the logical block number and logical sector number), even when the physical sector corresponding to the above data storage sector is changed (e.g., by reconstruction processing), it is not necessary to rewrite the link information 402, i.e., the link information 402 is not affected by a physical change of storage sectors. Note that, in the leading data storage sector (upper part of FIG. 5), the information 402a about an immediately-previous data storage sector is set such that all bits are 1 (FFFFh; the label "h" at the end of each bit string indicates "hexadecimal"), i.e., set: to an initial state. Similarly, in the last data storage sector, the information 402b about an immediately-subsequent data storage sector is set such that all bits are 1 (FFFFh). The logical block number and logical sector number where all bits are 1 is defined as a reserved number which is not related to any block or sector. With this number, the head or tail of data can be recognized. Even when a device where the state of bits after the block has been erased (initial state) is 0, data where all bits are 0 (0000h) is used in place of the data where all bits are 1, whereby the above arrangement can be achieved.

In an alternative example of this embodiment, a physical block number and physical sector number are used as the data link information in place of the logical block number and logical sector number. Still alternatively, a physical address may be used in place of the logical block number and logical sector number. Advantages of these two alternative examples reside in that conversion from logical data to physical data is not required, and accordingly, a wanted address can be quickly found at a high rate.

(Data Reading Method)

Hereinafter, a data reading method of the present invention is described with reference to the structure of the data management apparatus 1000 shown in FIG. 1, the various information tables shown in FIGS. 21 through 23, the ID management table of FIG. 3, and a flowchart of FIG. 6 which illustrates a method for determining an address from which data is read. In the example illustrated below, the data ID number is used as information for uniquely identifying data stored in the flash memory section 1002. In this example, data identified by the ID number=10 is read out.

In the first step, the application or operating system (OS) 1006 gives a data ID number (=10) of data to be read to the data management system control section 1005 (Step 201).

The data management system control section 1005 accesses the ID management table (FIG. 3) in the data management system memory section 1003 so as to acquire a logical block number of a block where the data of ID No. 10 is stored, a logical sector number corresponding to a data start sector (leading sector), and the data size of the data of ID No. 10 (Step 202).

Next, the date management system control section 1005 accesses the block information table 10 (FIG. 21) so as to acquire a physical block number of a block corresponding to the logical block number acquired at Step 202 (Step 203).

Thereafter, the data management system control section 1005 accesses the sector information table 11 (FIG. 22) so as to acquire a physical sector number of a sector which corresponds to the physical block number acquired at Step 203 and the logical sector number corresponding to the data start sector acquired at Step 202, and of which the sector state is "DATA VALID" (Step 204).

A physical address from which reading of data is started is determined as described below based on the physical size of the flash memory section 1002 which uniquely corresponds to a system memory address space.

In this example, the physical size of an erasure block is 010000h (64 kilo) bytes, the physical size of a sector is 000100h (256) bytes, and the start address of the flash memory section 1002 is 060000h. Using this information, the physical address where reading of data is started is calculated by using the calculation formula shown below (Step 205), and data having a size equal to the data size acquired at Step 202 is read out from the calculated physical address in the flash memory section 1002 via the flash memory control section 1004 (Step 206).

Calculation Formula:

(Address where reading of data is started)=(Start address of Flash memory section 1002, h])+(Physical size of erasure block, h])*(Physical block number acquired at Step 203)+(Size of sector, h])*(Physical sector number acquired at Step 204).

In the example described hereinabove, the leading sector of the sectors where data is stored is determined based on the ID number. Hereinafter, an example where data stored over a plurality of sectors is read out by using link information is described. In the first place, the link information according to the present invention is described.

Figure 7:
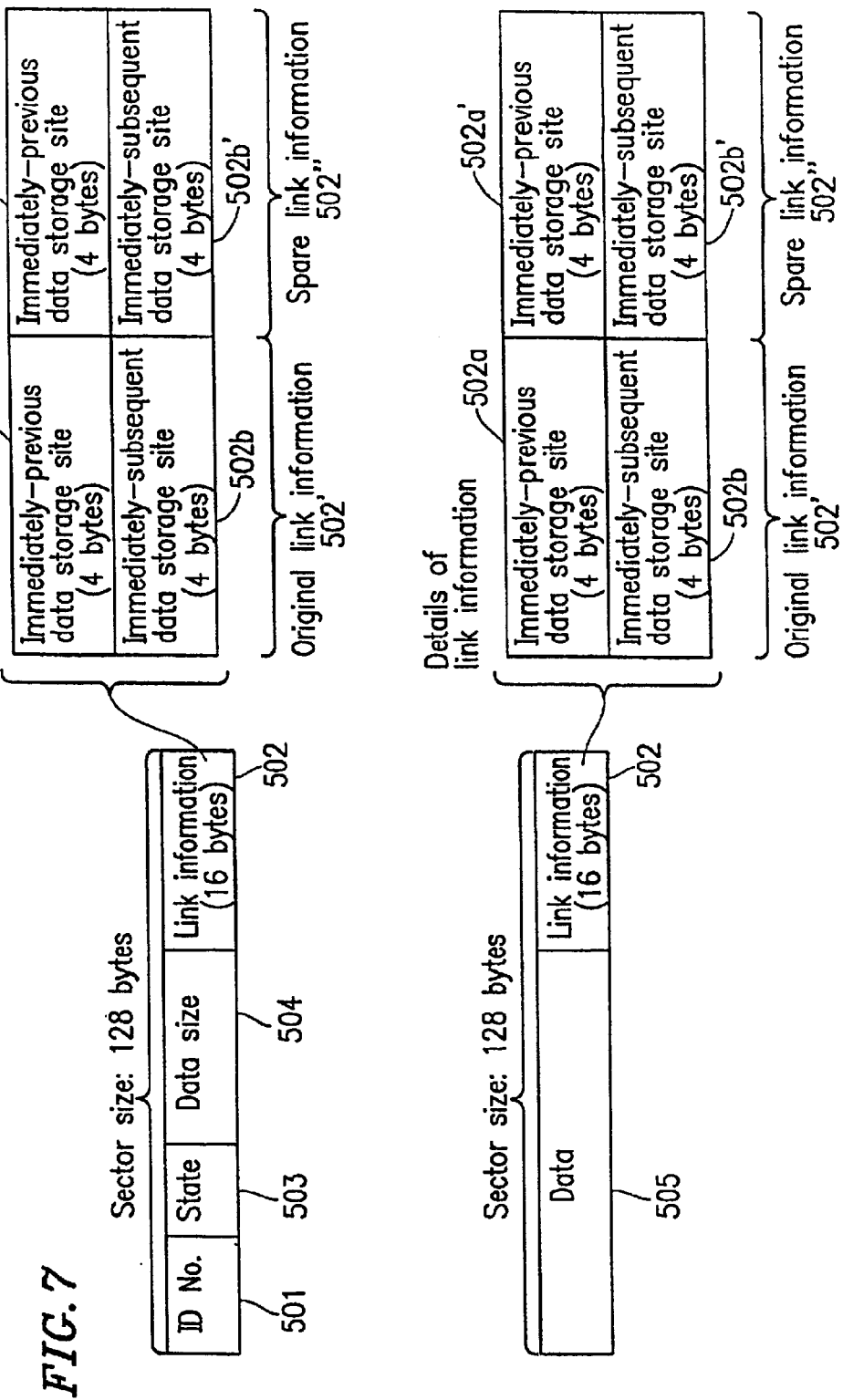
FIG. 7 is a data structure diagram showing an exemplary data structure where the link information of FIG. 5 is duplicated.

In the above example, if any malfunction is caused in the link information, reading of data cannot be correctly performed. In an alternative example, the link information has a duplicated structure as shown in FIG. 7 in order to avoid a malfunction in the link information. In FIG. 7, the link information 502 has a duplicated structure. The upper part of FIG. 7 shows a structure of the leading sector, and the lower part shows a structure of sectors which store main data. As shown in FIG. 7, the link information 502 includes spare link information 502" in addition to original link information 502'. The spare link information 502" has the same structure as that of the original link information 502', i.e., includes information 502a' about an immediately-previous data storage sector (4 bytes: logical block number (2 bytes) and logical sector number (2 bytes)) and information 502b' about an immediately-subsequent data storage sector (4 bytes: logical block number (2 bytes) and logical sector number (2 bytes)).

Figure 8:
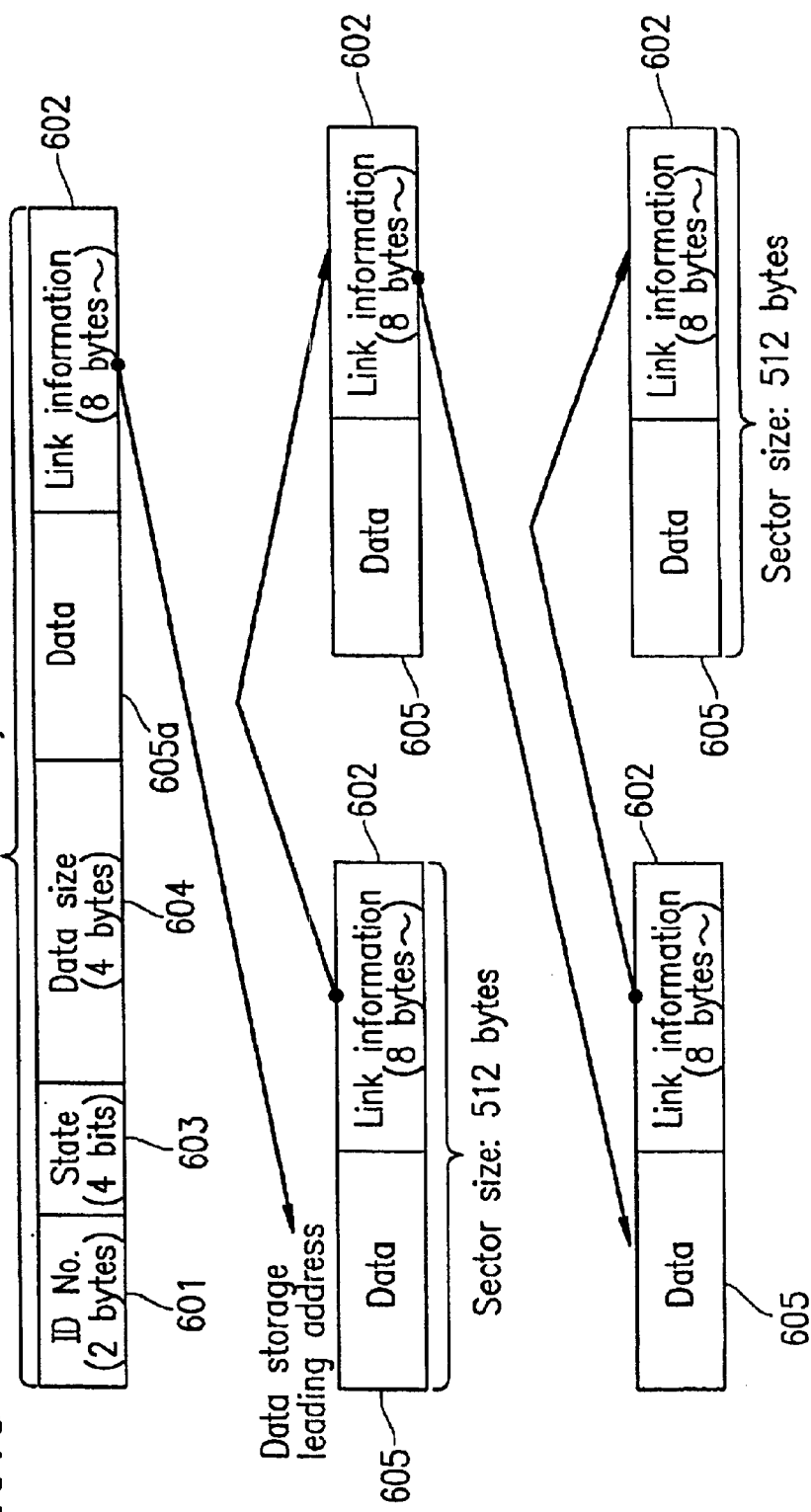
FIG. 8 is a data structure diagram showing an example where storage of main data is started from a leading sector.

FIG. 8 shows a structure of sectors when the size of each sector is relatively large in comparison to the data structure shown in FIG. 4 (in the example illustrated in FIG. 8, 512 bytes). If the leading sector shown in FIG. 8 stored only the information contained in the leading sector shown in FIG. 4, a large unused portion would be left in the leading sector of FIG. 8 because the size of the sector in FIG. 8 is large. Accordingly, the data storage efficiency is low. Thus, when the sector size is relatively large as shown in FIG. 8, storage of main data is started from the leading sector.

Next, a method for reading data by using the link information is described with reference to FIGS. 1, and 4 through 8, in conjunction with a flowchart of FIG. 9 which illustrates a method for calculating a read address by using the link information.

Figure 6:
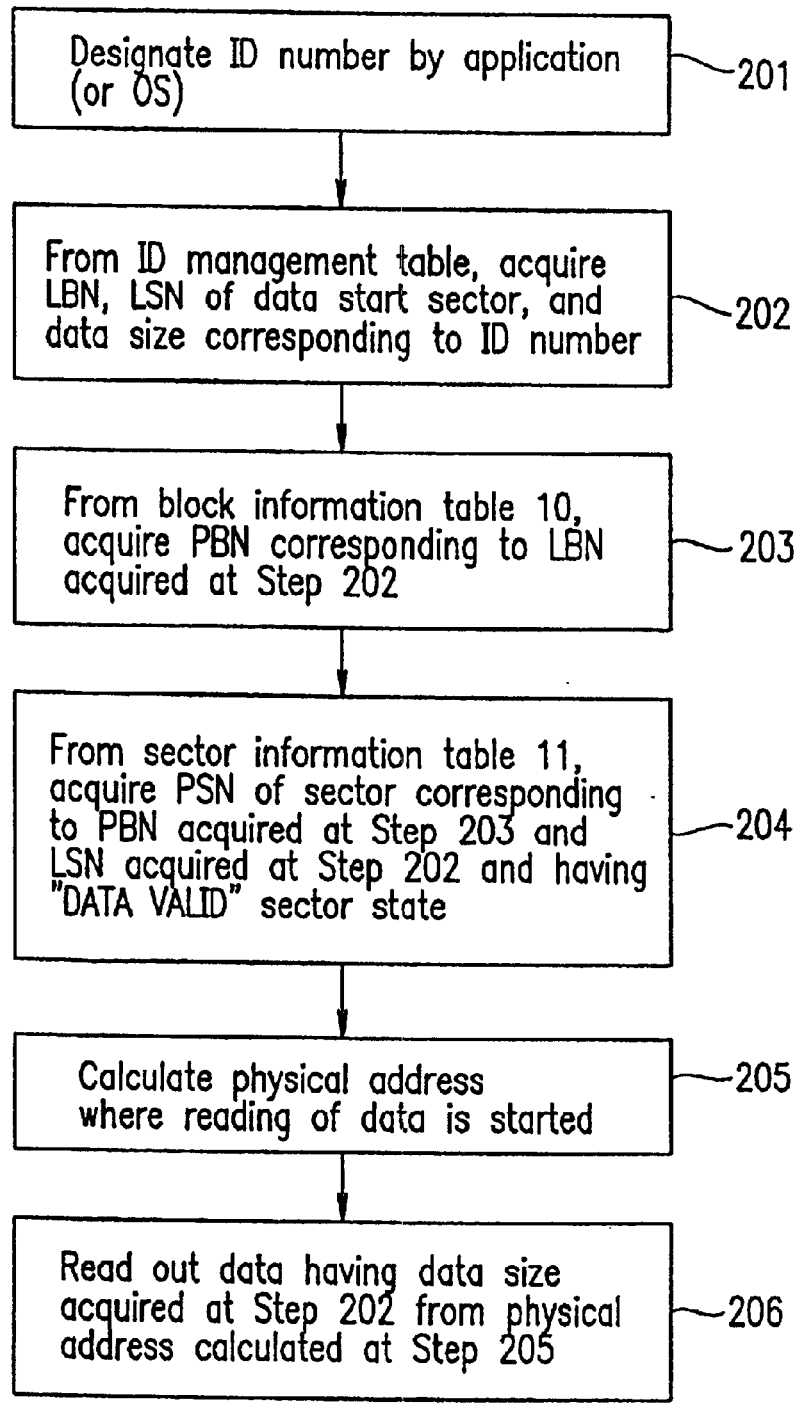
FIG. 6 is a flowchart illustrating an address calculation method of the present invention for calculating an address from which data is to be read.

In the first step, as shown in FIG. 6, the application or operating system (OS) 1006 designates, in the data management system 1001 of the present invention, an ID number of data to be read (Step 201).

Through the processes of steps 202–204 (shown in FIG. 6), a physical block number and a physical sector number are acquired from the ID management table, the block information table 10, and the sector information tables 11 and 12. The storage start address of data corresponding to the designated ID number (address where reading of data is started) is calculated by using the above-shown calculation formula used at Step 205 (FIG. 6).

Figure 9:
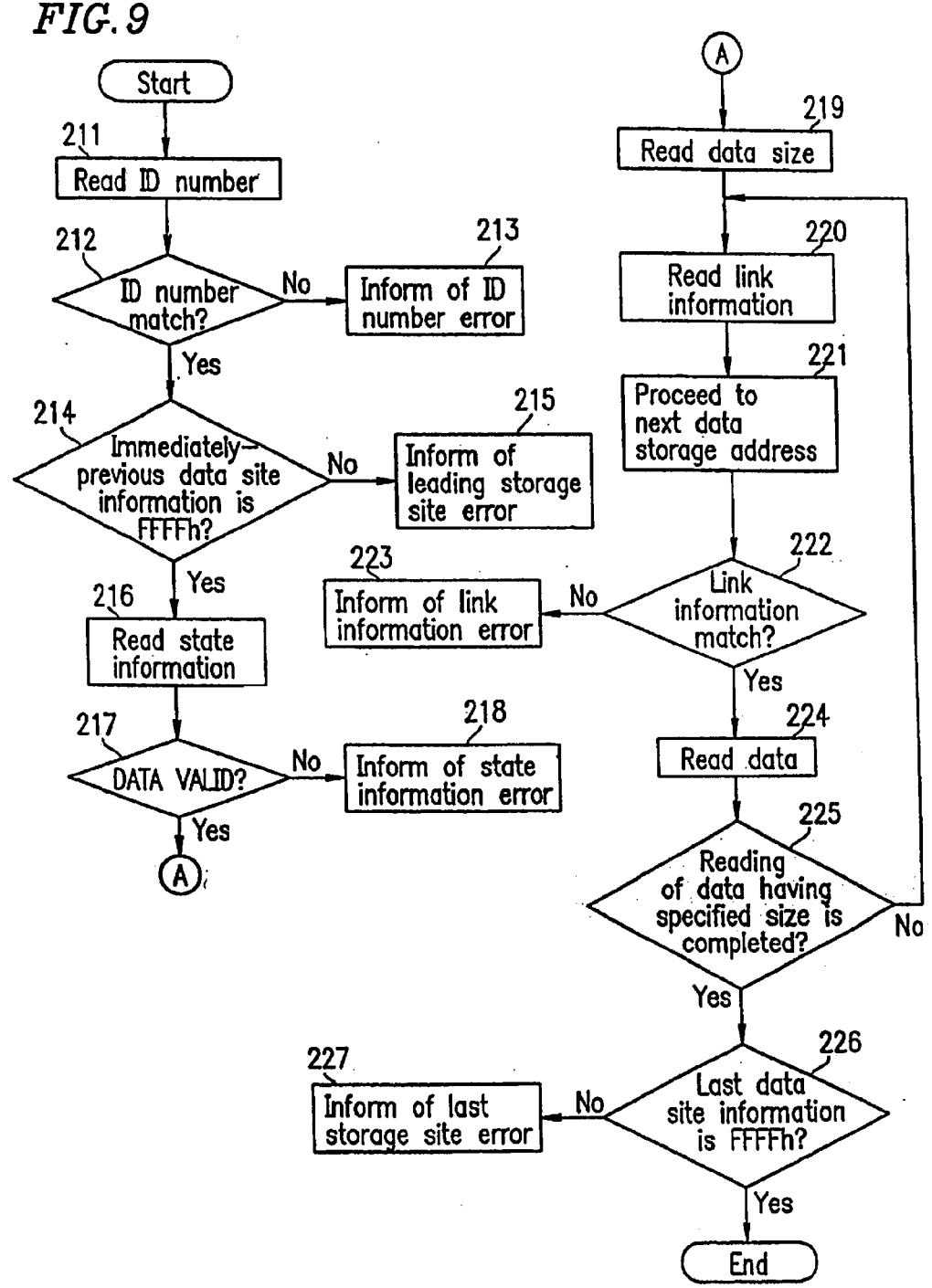
FIG. 9 is a flowchart illustrating a data read method which uses the link information of the present invention.

Then, referring to FIG. 9, an ID number (301, 401, 501, 601) is read from the storage start address (Step 211), and whether or not the obtained ID number matches with the ID number designated at Step 201 (FIG. 6) is confirmed, i.e., whether or not any abnormality exists in the ID number is confirmed (Step 212). When the ID numbers do not match, the data management system 1001 informs the application 1006 of an error which occurred in the ID number (Step 213). Furthermore, the data management system 1001 confirms that information about the immediately-previous data storage site (402a, 502a) is FFFFh (Step 214). This confirmation step is performed in order to confirm that no abnormality is caused in the leading storage site. When this confirmation is not successful, the data management system 1001 informs the application 1006 of an error in the leading storage site (Step 215).

Then, state information (303, 403, 503, 603) are read out (Step 216), and it is confirmed whether or not the state information is "DATA VALID" (Step 217). This confirmation step is performed in order to confirm that no abnormality exists in the state information. When this confirmation is not successful, the data management system 1001 informs the application 1006 of an error in the state information (Step 218).

Thereafter, the data size information (304, 404, 504, 604) is read out (Step 219). Then, the following steps are performed until reading of data having a size equal to the data size specified in the data size information is completed.

The link information is read, and the immediately-subsequent (next) data storage address is obtained from the read link information (Step 220). When the link information is duplicated link information (FIG. 7), the original link information 502' of the duplicated link information is read, and the immediately-subsequent (next) data storage address is obtained from the original link information 502'.

The reading process proceeds to the next data storage address obtained at Step 220 (Step 221), and it is confirmed whether or not the link information points to (matches with) the previous data storage address (Step 222). When the link information is duplicated link information (FIG. 7), it is confirmed whether or not the original link information 502' of the link information 502 points to (matches with) the previous data storage address.

When the link information is duplicated link information (FIG. 7), Steps 221 and 222 are additionally performed for the spare link information 502" of the Link information so as to confirm whether or not any discrepancy in storage address exists between the immediately-previous data and the immediately-subsequent data.

When the link information do not match with each other at Step 222, the data management system 1001 informs the application 1006 that there is an error in the link information (Step 223). In the case where the link information is duplicated link information (FIG. 7), when either the original link information or the spare link information does not match at Step 222, the data management system 1001 informs the application 1006 that there is an error in the readable link information. A virtue of such a double confirmation with the original link information and spare link information results in high reliability of read data. However, the data reading rate is low because two pairs of link information are read out for confirmation. In the case where the data reading rate has a higher priority over the data reliability, the spare link information may be omitted.

Then, data (305, 405, 505, 605a, 605) is read out (Step 224). It is confirmed whether or not data of the data size specified in the data size information has been read out (Step 225).

When the data having the specified data size has not been read out, the link information (302, 402, 502, 602) is readout so as to obtain a next data storage address, and subsequent data storage addresses are searched based on the link information to continue reading of data until the data having the specified data size (304, 404, 504, 604) has been read out.

After the reading of the data having the specified data size is completed, it is confirmed whether or not the information about an immediately-subsequent data storage sector (402b, 502b) in the link information of the last sector of the read data is FFFFh (which indicates the end of the data) (Step 226). This confirmation step is performed in order to confirm that no abnormality exists in the last storage site. When the information 402b or 502b is not FFFFh, the data management system 1001 informs the application 1006 of an error in the last storage site (Step 227).

(Another Example of Data Reading Method)

Another example of a data reading method with duplicated link information is described with reference to FIG. 7 in conjunction with FIGS. 1, 4, and 8.

In the first step, the application or operating system (OS) 1006 designates, in the data management system 1001 of the present invention, an ID number of data to be read.

Next, through the processes which are the same as steps 202–204 of FIG. 6, a physical block number and a physical sector number are acquired from the ID management table, the block information table 10, and the sector information tables 11 and 12. The storage start address of data corresponding to the designated ID number (address where reading of data is started) is calculated by using the calculation formula used at Step 205 of FIG. 6.

Then, an ID number (301, 401, 501, and 601) is read from the storage start address, and whether or not the obtained ID number matches with the ID number designated at the above step is confirmed. This confirmation step is performed in order to confirm whether or not any abnormality exists in the ID number. When the ID numbers do not match, the data management system 1001 informs the application 1006 of an error in the ID number. If the ID numbers match, the data management system 1001 confirms that information about the immediately-previous data storage site (402a, 502a) is FFFFh. This confirmation step is performed in order to confirm that no abnormality exists in the leading storage site. When this confirmation is not successful, the data management system 1001 informs the application 1006 of an error in the leading storage site.

Then, state information (303, 403, 503, 603) is read out, and it is confirmed whether or not the state information is "DATA VALID". This confirmation step is performed in order to confirm that no abnormality exists in the state information. When this confirmation is not successful, the data management system 1001 informs the application 1006 of an error in the state information.

Thereafter, the data size information (304, 404, 504, 604) is read out. The following steps are then performed until reading of data having a size equal to the data size specified in the data size information is completed.

The original link information 502' of the duplicated link information is read, and the immediately-subsequent (next) data storage address is obtained from the original link information 502".

The reading process proceeds to the next data storage address, and it is confirmed whether or not the original link information (502') of the link information 502 points to (matches with) the previous data storage address.

When the link information do not match with each other, it is not immediately determined to be an error in the link information at this time. The reading operation first returns to the immediately-previous data storage site. In the immediately-previous data storage site, the next data storage address is again obtained from the spare link information 502". The reading operation proceeds to the next data storage address obtained from the spare link information 502", and it is confirmed whether or not the information about an immediately-previous data storage sector (502a') of the spare link information 502" points to (matches with) the immediately-previous data storage site. This confirmation step is performed in order to confirm that no abnormality exists in the link information. When the information 502a' does not match with the immediately-previous data storage site, then the data management system 1001 informs the application 1006 that there is an error in the readable link information. In this example, when a malfunction is caused in the original link information, the data management system 1001 automatically uses the spare link information instead without raising an error with the application 1006. Thus, the reading process is prevented from wasting time by detouring around wrong sectors even when there is an error in the original link information. However, an error which may exist in the spare link information cannot be detected when the original link information involves no error, because in the above method, the spare link information is not referred to when the original link information involves no error.

Then, data (305, 405, 505, 605a, 605) is read out.

Then, the link information (302, 402, 502, 602) is read out so as to obtain a next data storage address.

Then, reading of data having a size equal to the data size specified in the data size information (304, 404, 504, 604) and searching of link information are alternately repeated.

After the reading of the data having the specified data size is completed, it is confirmed whether or not the information about an immediately-subsequent data storage sector (502b, 502b') in the link information (302, 402, 502, 602) of the last sector of the read data is FFFFH (which indicates the end of the data). This confirmation step is performed in order to confirm that no abnormality exists in the last storage site. When the confirmed information (502b, 502b') is not FFFFh, the data management system 1001 informs the application 1006 of an error in the last storage site.

When the application 1006 receives the error information from the data management system 1001, the application 1006 reads out the data identified by the above ID number into a RAM (included in an unshown application), and the ID number stored in the flash memory section 1002 is deleted, i.e., the states of all the sectors which contain the data corresponding to the ID number are invalidated. Then, a new ID number is assigned to the data read out to the RAM, and the data with the new ID number is written in the flash memory section 1002. This process is referred to as an "error correction process". In this process, the data with the new ID number is written in new sectors which are different to those where it was. If there are unused sectors sufficient for writing the data with the new ID number, it is not necessary to perform a block erasure operation (reconstruction operation).

When the application 1006 receives the error information from the data management system 1001, if the number of errors caused in the link information is only one, such an error can be detected and corrected by a normal operation of the linkage structure of the present invention. Note that, in a normal system, the probability that two or more errors are simultaneously caused in the link information is very small.

(Example of Data Reading Method with Triplicated Link Information)

Figure 10:
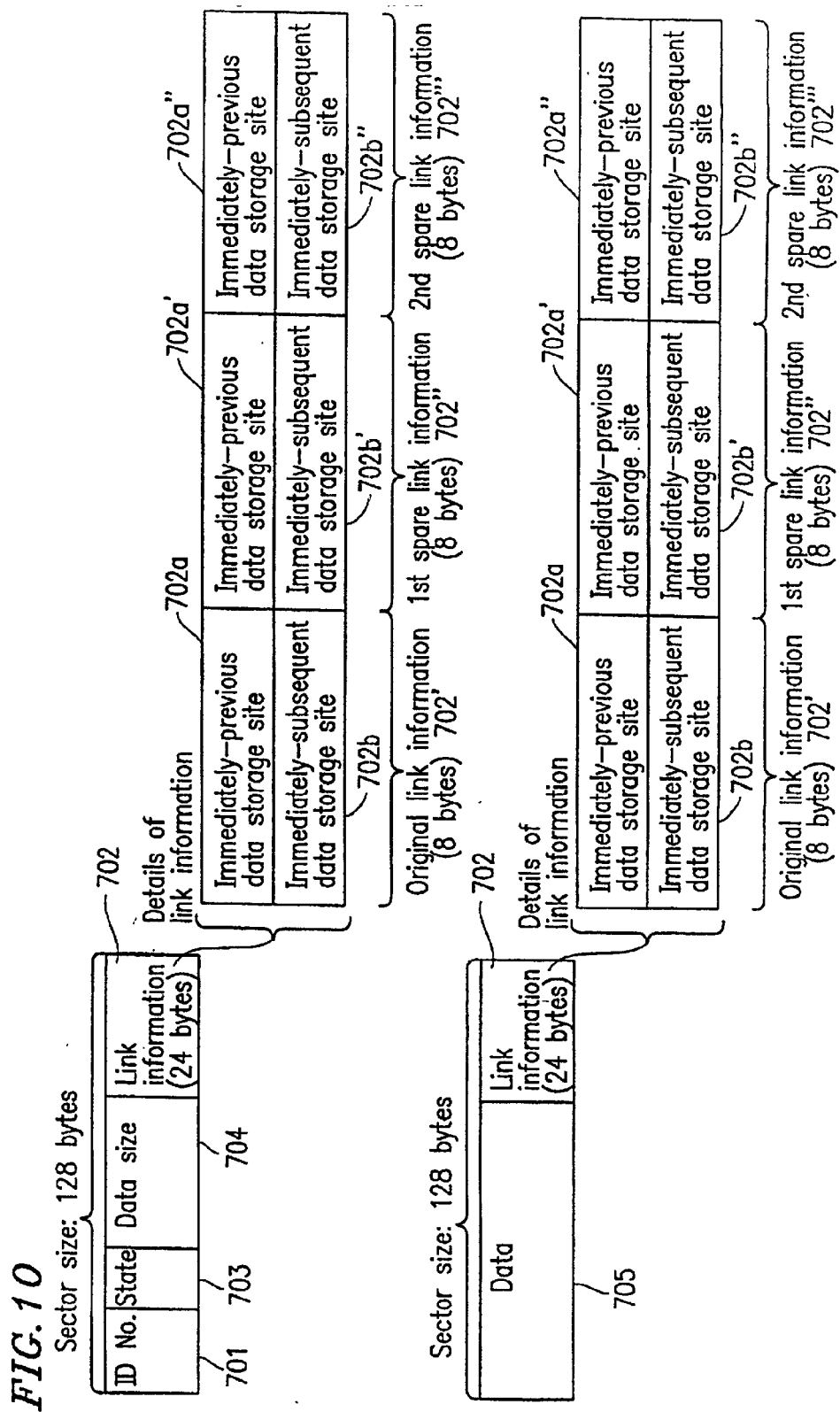
FIG. 10 is a data structure diagram showing still another example of the link information having three pairs of link information including the same content.

FIG. 10 shows an example of a data reading method with triplicated link information in which the error-processing function for link information is enhanced. Link information 702 shown in FIG. 10 is an extended version of the link information 505 shown in FIG. 7. The spare link information 502" shown in FIG. 7 corresponds to first spare link information 702" shown in FIG. 10, and has the same content as that of original link information 702'. The link information 702 includes information having the same content as that of the first spare link information 702" as second spare link information 702'''.

Hereinafter, a data reading method with triplicated link information is described with reference to FIG. 10 in conjunction with FIGS. 1, 4, and 8. In this example, in preparation for an occurrence of a malfunction in the link information, another pair of link information is added to the above duplicated link information 502 so as to form triplicated link information.

In the first step, the application or operating system (OS) 1006 designates, in the data management system 1001 of the present invention, an ID number of data to be read.

Next, through the processes which are the same as steps 202–204 of FIG. 6, a physical block number and a physical sector number are acquired from the ID management table, the block information table 10, and the sector information tables 11 and 12. The storage start address of data corresponding to the designated ID number (address where reading of data is started) is calculated by using the above-described calculation formula.

Then, an ID number (301, 601, 701) is read from the storage start address, and whether or not the obtained ID number matches with the ID number designated at the above step is confirmed. This confirmation step is performed in order to confirm whether or not any abnormality exists in the ID number. When the ID numbers do not match, the data management system 1001 informs the application 1006 of an error in the ID number. If the D) numbers match, the data management system 1001 confirms that information about the immediately-previous data storage site (702*a*) is FFFFh. This confirmation step is performed in order to confirm that no abnormality exists in the leading storage site. When this confirmation is not successful, the data management system 1001 informs the application 1006 of an error in the leading storage site.

Then, state information (303, 503, 703) are read out, and it is confirmed whether or not the state information is "DATA VALID". This confirmation step is performed in order to confirm that no abnormality exists in the state information. When this confirmation is not successful, the data management system 1001 informs the application 1006 of an error in the state information.

Thereafter, the data size information (304, 504, 704) is read out. The following steps are then performed until reading of data having a size equal to the data size specified in the data size information is completed.

The original link information 702' of the multiplexed link information is read, and the immediately-subsequent (next) data storage address is obtained from the original link information 702'.

The reading process proceeds to the next data storage address, and it is confirmed whether or not the original link information (702') of the link information 702 points to (matches with) the previous data storage address.

Further, the above two steps, i.e., the address calculation step and address confirmation step, are performed with the first spare link information 702" so as to confirm whether or not any discrepancy in storage address exists between the current data and the immediately-previous data.

Furthermore, the above two steps, i.e., the address calculation step and address confirmation step, are also performed with the second spare link information 702''' so as to confirm whether or not any discrepancy in storage address exists between the current data and the immediately-previous data.

When at least one of the original link information 702' and the first and second spare link information 702" and 702''' does not match at Step 222, the data management: system 1001 informs the application 1006 that there is an error in the readable link information. A virtue of such a triple confirmation with the original link information and the first and second spare link information resides in high reliability of read data. However, the data reading rate is low because three pairs of link information are read out for confirmation.

Then, data (305, 605*a*, 605, 705) is read out.

Then, the link information (302, 702) is read out so as to obtain a next data storage address.

Then, reading of data having a size equal to the data size specified in the data size information (304, 604, 704) and searching of link information are alternately repeated.

After the reading of the data having the specified data size is completed, it is confirmed whether or not the information about an immediately-subsequent data storage sector (702*b*, 702*b'*, 702*b"*) in the link information 702 of the last sector of the read data is FFFFh (which indicates the end of the data). This confirmation step is performed in order to confirm that no abnormality exists in the last storage site. When the confirmed information (702*b*, 702*b'*, 702*b"*) is not FFFFh, the data management system 1001 informs the application 1006 of an error in the last storage site.

(Example of Data Reading Method Which Uses Error-Correcting Code as Link Information)

Figure 11:
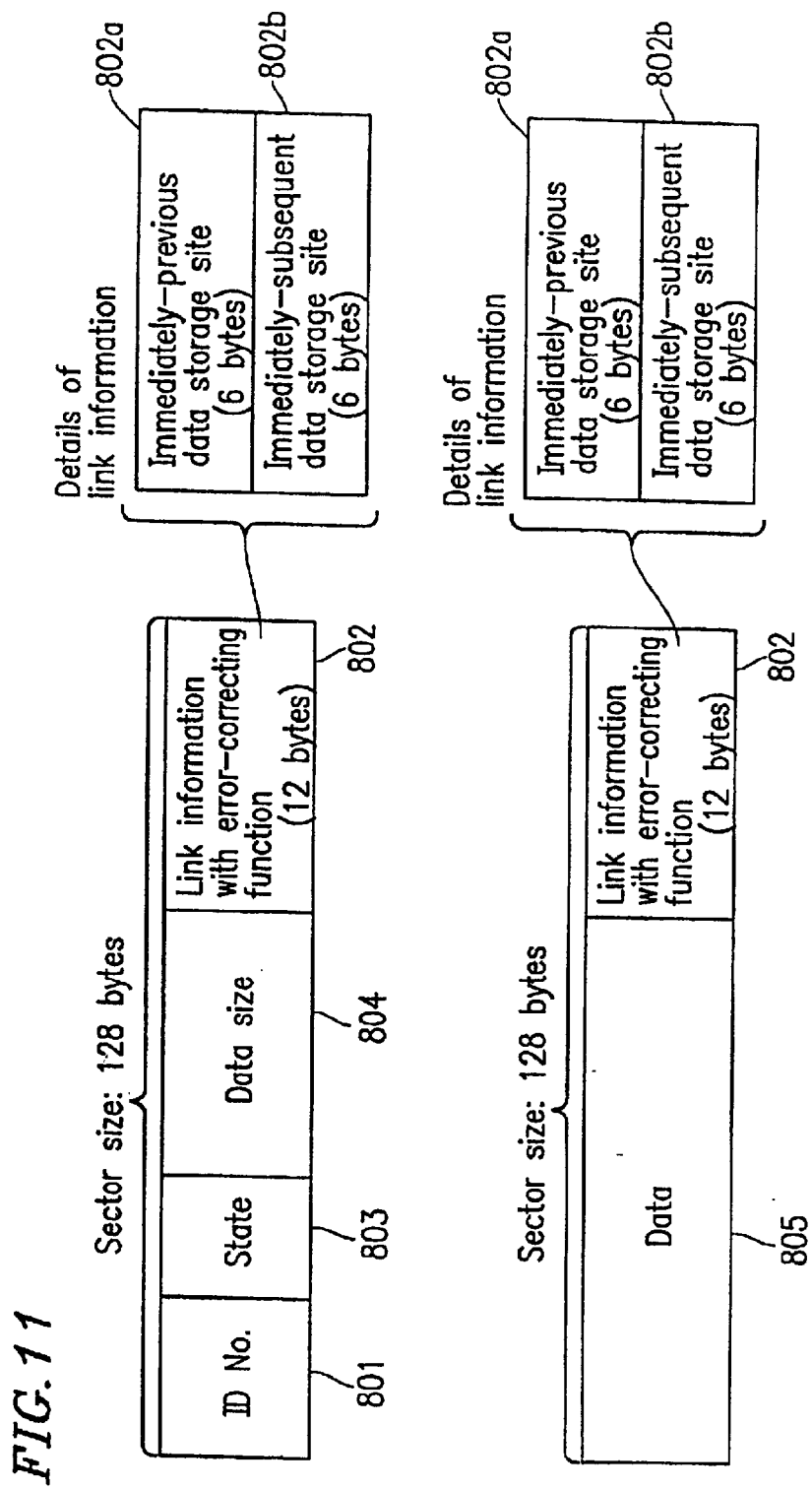
FIG. 11 is a data structure diagram showing still another example of the link information having an error correcting code in the link information.
Figure 12:
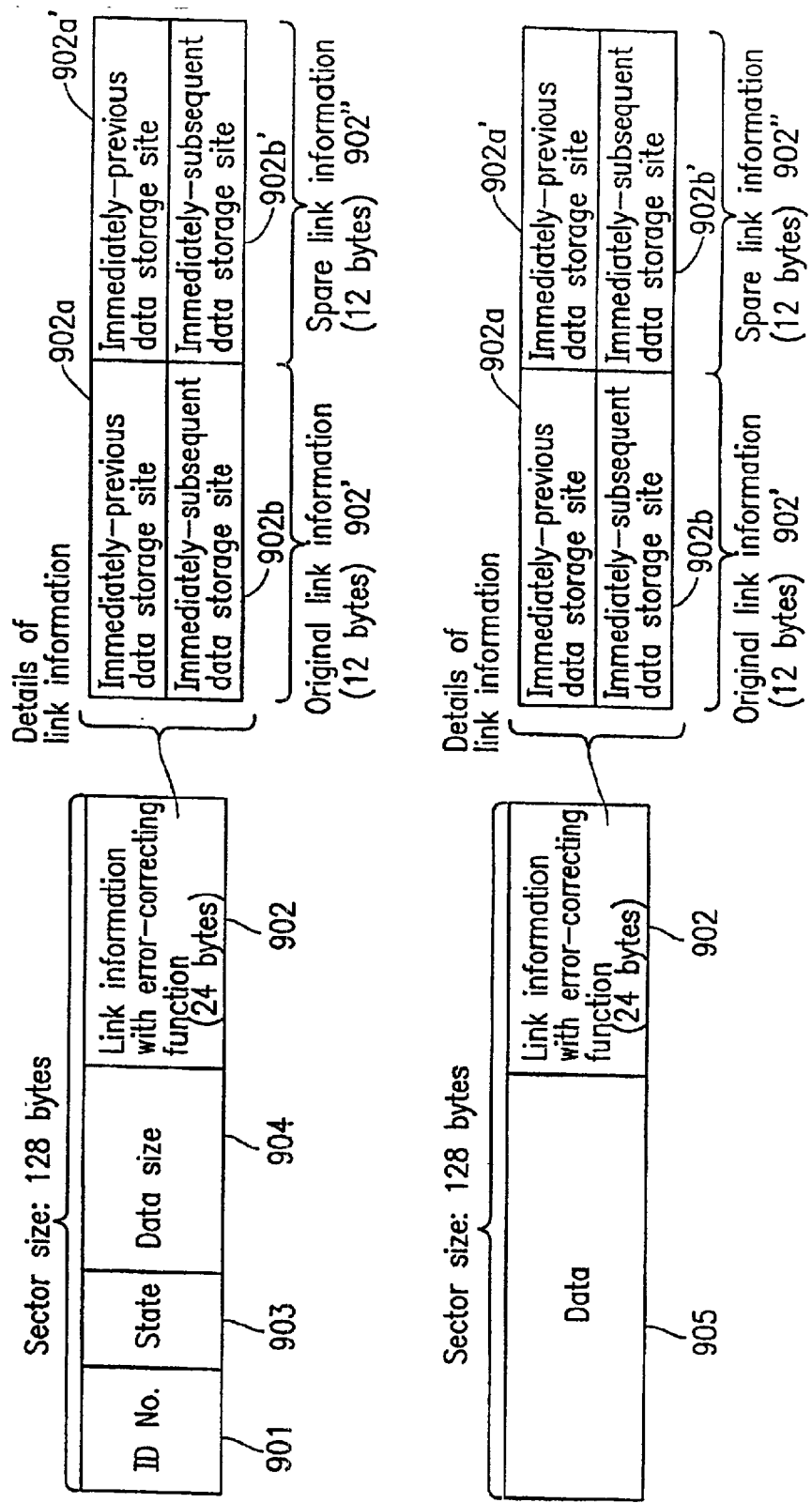
FIG. 12 is a data structure diagram showing still another example having an error correcting code in the link information which includes spare link information.
Figure 13:
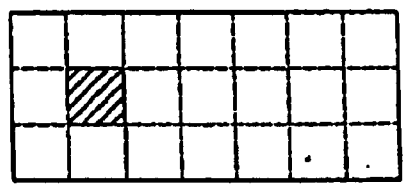
FIG. 13 is a diagram showing a structure of a physical erasure block including logical sectors according to a conventional technique.
Figure 14:
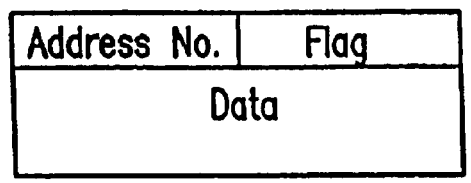
FIG. 14 is a data structure diagram showing a logical sector according to a conventional technique.
Figure 15:
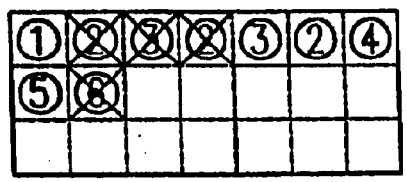
FIG. 15 is a diagram illustrating update/erasure of data in the physical erasure block/logical sector structure.
Figure 16:
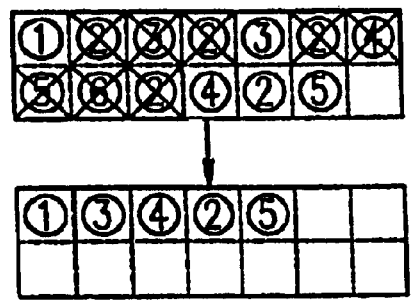
FIG. 16 is a diagram illustrating a reconstruction operation in a physical block.

FIGS. 11 and 12 show examples of link information which use an error-correcting code for the purpose of enhancing the link information. As the error-correcting code, for example, a Hamming code which was conceived by Dr. Hamming of the Bell Laboratories in 1950 may be used. That is, in this case, data for confirmation calculated from an original link information (Hamming code) is added to the original link information. When the Hamming code is used, an error existing in data can be detected, and in addition, the data can be corrected to a correct value. That is, the link information can be enhanced by using the Hamming code. For example, by adding 2 bytes of an error-correcting code to each of the link information 402*a* and 402*b* of FIG. 5 (4 byte-increase in total from the link information 402), an error-correcting effect which is equal to or greater than that produced by a duplicated link information shown in FIG. 7 (8 byte-increase from the link information 502) can be obtained.

Hereinafter, a data reading method with link information having a Hamming code is described with reference to FIGS. 11 and 12 in conjunction with FIG. 1.

In the first step, the application or operating system (OS) 1006 designates, in the data management system 1001 of the present invention, an ID number of data to be read.

Next, through the processes which are the same as steps 202–204 of FIG. 6, a physical block number and a physical sector number are acquired from the ID management table, the block information table 10, and the sector information tables 11 and 12. The storage start address of data corresponding to the designated ID number (address where reading of data is started) is calculated by using the above-described calculation formula used at Step 205, (FIG. 6).

Then, an ID number (801, 901) is read from the storage start address, and whether or not the obtained ID number matches with the ID number designated at the above step is confirmed. This confirmation step is performed in order to confirm whether or not any abnormality exists in the ID number. When the ID numbers do not match, the data management system 1001 informs the application 1006 of an error in the ID number. If the ID numbers match, the data management system 1001 confirms that information about the immediately-previous data storage site (802*a*, 902*a*) is FFFFH. This confirmation step is performed in order to confirm that no abnormality exists in the leading storage site. When this confirmation is not successful, the data management system 1001 informs the application 1006 of an error in the leading storage site.

Then, state information (803, 903) is read out, and it is confirmed whether or not the state information is "DATA VALID". This confirmation step is performed in order to confirm that no abnormality exists in the state information. When this confirmation is not successful, the data management system 1001 informs the application 1006 of an error in the state information.

Thereafter, the data size information (804, 904) is read out. The following steps are then performed until reading of data having a size equal to the data size specified in the data size information is completed.

The link information is read, and the immediately-subsequent (next) data storage address is obtained from the read link information (Step 220). When the link information is duplicated link information (FIG. 12), the original link-information 902' of the duplicated link information 902 is read, and the immediately-subsequent (next) data storage address is obtained from the original link information 902'.

The reading process proceeds to the next data storage address, and it is confirmed whether or not the immediately-previous data storage site of the link information points to (matches with) the previous data storage address. When the link information is duplicated link information (FIG. 12), it is confirmed whether or not the original link information (902*a*) of the link information 902 points to (matches with) the link information of the previous data storage address (902*b*).

When the link information is duplicated link information (FIG. 12), the above two steps are additionally performed for the spare link information 902" of the link information 902 so as to confirm whether or not any discrepancy in storage address exists between the current data and the immediately-previous data.

When the link information do not match with each other, the data management system 1001 informs the application 1006 that there is an error in the link information even though the data can be read out without being interrupted. In the case where the link information is duplicated link information (FIG. 12), when either the original link information or the spare link information does not match, the data management system 1001 informs the application 1006 that there is an error in the link information even though the data can be read out without being interrupted.

Then, data (805, 905) is read out.

Then, the link information (802, 902) is read out so as to obtain a next data storage address.

Then, reading of data having a size equal to the data size specified in the data size information (804, 904) and searching of link information are alternately repeated.

After the reading of the data having the specified data size is completed, it is confirmed whether or not the information about an immediately-subsequent data storage sector (802*b*, 902*b*) in the link information of the last sector of the read data is FFFFh (which indicates the end of the data). This confirmation step is performed in order to confirm that no abnormality exists in the last storage site. When the information (802*b*, 902*b*) is not FFFFh, the data management system 1001 informs the application 1006 of an error in the last storage site.

Also when link information has an error-correcting function realized by an error-correcting code, such as a Hamming code, if an error is caused anywhere in the link information, the data management system 1001 informs the application 1006 of such an error. Furthermore, the size of the link information with the error-correcting code is smaller than that of duplicated link information.

As described above, according to the present invention, data to be stored is divided into uniform small data segments in units of a sector. Link information, which is information about immediately-previous and immediately-subsequent data storage sites, is added to each data segment such that the data segments are linked together. With such a structure, any size of data can be efficiently stored over the entire data storage region without securing physically-consecutive unused address regions.

According to a data storage method of the present invention, data having a size greater than that of an erasure block is stored in a distributed manner. The data is divided into a plurality of data segments, and link information, which is information about immediately-previous and immediately-subsequent data storage sites, is added to each data segment such that the data segments are linked together. While following the link information, the data segments are stored in a separately-distributed manner. In this method, when an error exists in the link information of the stored data, it is impossible to access the distributed data segments according to the determined order, and thus, the data cannot be correctly read out. Accordingly, in such data where an error exists in the link information, the state information of sectors existing after a sector where the error exists cannot be updated to the used ("INVALID") state. Therefore, data segments stored in the sectors existing after the error sector cannot be deleted and left even after a reconstruction operation (i.e., such data segments keep occupying the data storage region).

As described above, in the method disclosed in Japanese Laid-Open Publication No. 7-44451, when an error exists in the data link information, the stored data cannot be read and displayed in a correct order.

According to the present invention, for the purpose of avoiding the above problem, in the link information added to the head portion of data, data where all bits are 1, which indicates the leading data storage site, is stored as information about the immediately-previous data storage site. In the link information added to the tail portion of data, data where all bits are 1, which indicates the last data storage site, is stored as information about the, immediately-subsequent data storage site. In this case, the data where all bits are 1 represents an initial state where a block is erased. Thus, when an error exists, the error can be readily and securely identified by virtue of such a function.

According to the present invention, when data is stored using a data link structure in a distributed manner, a plurality of link information having the same content is stored in the data link information. With such an arrangement, the resilience of the link information against errors can be improved. The probability that reading of data is disturbed due to an error in the link information can be reduced such that no problem is caused in practical use. If an error exists in the link information, the error can be corrected by an error-correcting code. Thus, problems involved in conventional techniques where a portion of data cannot be correctly read out, or that data is left undeleted after a reconstruction operation, can be solved. Accordingly, the reliability of the system can be further improved.

In the above descriptions, a read operation has been described as a data management method in a data management apparatus according to the present invention. However, the method for referring data to be accessed by using the data link information according to the present invention is not limited to the read operation. For example, when writing data, it is necessary to select a block including many unused sectors which is suitable for writing of data. Sectors in which data is to be stored is referred to by the above-described method. For example, in a method for selecting a block suitable for writing of data, a storage device region is divided into a plurality of partitions, and data management is performed in units of a partition.

As the data management system memory section 1003, an SRAM with a backup battery or a ferroelectric memory may be used. When the ferroelectric memory is used, a backup battery may be omitted. When a nonvolatile RAM, such as a ferroelectric memory, is used in the data management system memory section 1003, the block control sector (512 bytes) of FIG. 20 can be set on the nonvolatile RAM, and accordingly, the block control sector (512 bytes) can be omitted from the flash memory section 1002.

The data management method has been described in the above examples of the embodiment of the present invention, but a data management system corresponding to the data management method was not specifically described. The data management system control section 1005 includes: means (section) for searching a leading sector of data corresponding to an ID number supplied by software, such as the application program or operating system (OS) 1006, and comparing information about an immediately-previous data storage site of data link information stored in the leading sector with data where all the bits indicate the state that a block is erased; and means (section) for informing, when the comparison result is negative, software such as an application program or an operating system that there is an error in the data link information.

The data management system control section 1005 includes: means (section) for searching a leading sector of data corresponding to an ID number supplied by software, such as the application program or operating system (OS) 1006, and when the last sector is referred to while sequentially following, from the leading sector, information about immediately subsequent data storage site included in data link information stored in each sector, comparing information about an immediately-subsequent data storage site of data link information stored in the last sector with data where all the bits indicate the state that: a block is erased; and means (section) for informing, when the comparison result is negative, software such as an application program or an operating system (OS) 1006 that there is an error in the data link information.

The data management system control section 1005 includes means (section) for confirming for at least each distributed data segment, when at least data link information is referred to, whether or not any discrepancy exists between information about an immediately-subsequent data storage site which is stored in each sector and information about an immediately-previous data storage site which is stored in a next sector appointed by the information about the immediately-subsequent data storage site.

The data management system control section 1005 includes means (section) for confirming for each distributed data segment, by using each pair of data link information, when at least data link information is referred to, whether or not any discrepancy exists between information about an immediately-subsequent data storage site which is stored in each sector and information about an immediately-previous data storage site which is stored in a next sector appointed by the information about the immediately-subsequent data storage site.

The data management system control section 1005 includes means (section) for: confirming, when one of the plurality of link information having the same content is referred to, by using a pair of data link information, whether or not any discrepancy exists between information about an immediately-subsequent data storage site which is stored in each of distributed sectors and information about an immediately-previous data storage site which is stored in a next sector; and performing the confirmation by using another pair of data link information if any discrepancy exists.

The data management system control section 1005 includes means (section) for: referring, for the purpose of confirming whether or not any discrepancy exists between information concerning data storage sites, to data appointed by information about an immediately-subsequent data storage site which is included in data link information of one of distributed data segment; and comparing information about an immediately-previous data storage site of data-Link information stored in an immediately-subsequent sector with information about an immediately-previous data storage site.

The data management system control section 1005 includes means (section) for correcting information about a data storage site to correct information by using an error-correcting code when any discrepancy exists between the information about data storage sites.

The data management system control section 1005 includes means (section) for correcting a plurality of data link information having the same content when the content involves any discrepancy, such that data involving the discrepancy is corrected by using data involving no discrepancy.

The data management system control section 1005 includes means (section) for informing software, such as an application program, operating system, etc., when a plurality of data link information having the same content have any discrepancy in the content.

As described above, according to the present invention, data to be stored is divided into data segments having a uniform small size. The data segments are interrelated by adding, to each data segment, data link information containing information about immediately-previous and immediately-subsequent data storage sites. With such an arrangement, any size of data can be efficiently stored over the entire data storage region without securing physically-consecutive unused address regions.

According to the present invention, logical numbers, such as logical block numbers and logical sector numbers, may be used as data link information, and therefore, it is not necessary to rewrite the number of a site where data is stored even when the physical position of the data is changed.

According to the present invention, physical numbers, such as physical block numbers and physical sector numbers, are used as data link information, and therefore, it is not necessary to convert a logical number to a physical number. Thus, desired data can be specified at a high rate.

According to the present invention, data where all the bits are 1 (which is the bit state when a block is erased) is stored, as information about an immediately-previous data storage site, in a sector containing the leading data segment among distributed data segments, or is stored, as information about an immediately-subsequent data storage site, in a sector containing the last data segment among distributed data segments. With such an arrangement, the sector is readily identified as being at the head or tail of the stored data. Since the data where all the bits are 1 represents the erased state, an error in the stored data can be readily found.

According to the present invention, information about immediately-previous and immediately-subsequent data storage sites are stored as data link information by using an error-correcting code, such as a Hamming code. Thus, the link information has a structure resistant to breakage.

According to the present invention, data is identified by ID numbers, and a relationship between the ID numbers and leading addresses where the data is stored is managed in an RAM region. Thus, a leading address of a data storage site can be found at a high rate.

According to the present invention, the data link information includes two sets of link information having the same content, (for example, original link information and spare link information). With such a structure, even when an error exists in one set of link information during a data read operation, data can be correctly read out.

According to the present invention, it is checked whether or not information about an immediately-previous or immediately-subsequent data storage site, which is stored in the leading or last sector among the sectors where a group of data is stored, is data where all the bits are 1. Thus, it can be readily and accurately determined whether or not the data link information of the leading or last sector is correct.

According to the present invention, when the data link information includes a plurality of link information having the same content (for example, original link information and spare link information), at least during a data read operation, it is confirmed whether or not any discrepancy exists in the original information, and in addition, it is confirmed whether or not any discrepancy exists in the spare information. Thus, an error in the link information can be readily found.

According to the present invention, when the data link information includes a plurality of link information having the same content (for example, original link information and spare link information), at least during a data read operation, it is confirmed whether or not any discrepancy exists in the original information, it is confirmed whether or not any discrepancy exists in the spare information, and in addition, it is confirmed whether or not any discrepancy exists between the original information and the spare information. Thus, the link information has a structure resistant to breakage.

According to the present invention, the data link information includes a plurality of link information. Thus, even if any discrepancy exists in some of the plurality of link information, data can be read by using link information having no discrepancy. Therefore, the link information has a structure resistant to breakage.

According to the present invention, whether or not any discrepancy exists in the data link information can be readily confirmed by comparing link information between two consecutive sectors.

According to the present invention, when any discrepancy exists in link information, the link information can be corrected to correct link information by using an error-correcting code.

According to the present invention, when any discrepancy exists in link information, the link information can be corrected by using another link information having no discrepancy. Thus, the reliability of a system can be improved.

According to the present invention, when any discrepancy exists in link information, an error message is sent to an application. In response to the message, the application can detect and correct an error in the link information.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A data management system, comprising:
   a nonvolatile semiconductor storage section including a plurality of blocks capable of storing data, the data being erasable in units of a block;
   a storage control section for controlling a storage operation of the nonvolatile semiconductor storage section;
   a data management system control section for processing data to be stored in the nonvolatile semiconductor storage section; and
   a data management system memory section for storing management data which is referred to by the data management system control section,
   wherein the data management system control section performs data management by: dividing data into data segments in units of a sector which is a logical unit for data management; storing link information which indicates the ordinal relationship of the data segments, together with the data segments, in the nonvolatile semiconductor storage section via the storage control section; and storing, as link information in each sector, information about an immediately-previous data storage site and an immediately-subsequent data storage site.

2. A data management system according to claim 1, wherein the link information has number information for logical management which is allocated by the data management system control section.

3. A data management system according to claim 2, wherein the number information includes at least a logical block number and a logical sector number.

4. A data management system according to claim 1, wherein the link information has number information for physical management which is allocated by the data management system control section.

5. A data management system according to claim 4, wherein the number information includes at least a physical block number and a physical sector number.

6. A data management system according to claim 1, wherein: the link information includes:
   data where all bits are in a bit state that indicates that a block is erased, as information about the immediately-previous data storage site for a leading data segment of the data segments; and
   data where all bits are in a bit state that indicates that a block is erased, as information about the immediately-subsequent data storage site for a last data segment of the data segments.

7. A data management system according to claim 6, wherein the link information further includes an error-correcting code for error-correcting information about the immediately-previous data storage site and information about the immediately-subsequent data storage site.

8. A data management system according to claim 7, wherein the error-correcting code is a Hamming code.

9. A data management system according to claim 6, wherein the data management system control section includes:
   a section for searching a leading sector of data corresponding to an identification (ID) number supplied by software and comparing information about an immediately-previous data storage site of link information stored in the leading sector with data where all bits indicate a state where a block is erased; and
   a section for informing, when the comparison result is negative, the software that there is an error in the link information.

10. A data management system according to claim 9, wherein the data management system control section includes:
- a section for searching a leading sector of data corresponding to an identification (ID) number supplied by the software, and when the last sector is referred to, comparing information about an immediately-subsequent data storage site of link information stored in the last sector with data where all bits indicate a state where a block is erased; and
- a section for informing, when the comparison result is negative, the software that there is an error in the link information.

11. A data management system according to claim 9, wherein the data management system control section includes a section for correcting information about a data storage site by using an error-correcting code when any discrepancy exists between the information about data storage sites.

12. A data management system according to claim 6, wherein the data management system control section includes:
- a section for searching a leading sector of data corresponding to an identification (ID) number supplied by software, and when the last sector is referred to comparing information about an immediately-subsequent data storage site of link information stored in the last sector with data where all the bits indicate a state where a block is erased; and
- a section for informing, when the comparison result is negative, the software that there is an error in the link information.

13. A data management system according to claim 1, wherein the link information further includes an error-correcting code for error-correcting the information about the immediately-previous data storage site and the information about the immediately-subsequent data storage site.

14. A data management system according to claim 13, wherein the error-correcting code is a Hamming code.

15. A data management system according to claim 1, wherein the data management system control section manages correspondence between an identification (ID) number supplied by software, and a leading data segment of the data segments such that data stored in the nonvolatile semiconductor storage section can be identified by the ID number.

16. A data management system according to claim 1, wherein the link information includes a plurality of link information having the same content.

17. A data management system according to claim 16, wherein the data management system control section includes a section for confirming for each data segment, by using each pair of link information, when at least the link information is referred to, whether or not any discrepancy exists between information about an immediately-subsequent data storage site which is stored in each sector and information about an immediately-previous data storage site which is stored in a next sector indicated by the information about the immediately-subsequent data storage site.

18. A data management system according to claim 17, wherein the data management system control section includes a section for correcting a plurality of link information having the same content when the content involves any discrepancy, such that data involving the discrepancy is corrected by using data involving no discrepancy.

19. A data management system according to claim 16, wherein the data management system control section includes a section for: confirming, when one of the plurality of link information having the same content is referred to, by using a pair of link information, whether or not any discrepancy exists between information about an immediately-subsequent data storage site which is stored in each sector and information about an immediately-previous data storage site which is stored in a next sector indicated by the information about the immediately-subsequent data storage site; and performing another confirmation by using another pair of link information if any discrepancy exists.

20. A data management system according to claim 1, wherein the data management system control section includes a section for confirming for each data segment, when the link information is referred to, whether or not any discrepancy exists between information about an immediately-subsequent data storage site which is stored in each sector and information about an immediately-previous data storage site which is stored in a next sector indicated by the information about the immediately-subsequent data storage site.

21. A data management system according to claim 20, wherein the data management system control section includes a section for: referring, for the purpose of confirming whether or not any discrepancy exists between information concerning data storage sites, to data indicated by information about an immediately-subsequent data storage site which is included in link information of one of the data segments; and comparing information about an immediately-previous data storage site of link information stored in an immediately-subsequent sector with information about an immediately-previous data storage site.

22. A data management system according to claim 1, wherein the data management system control section includes a section for informing software when a plurality of link information having the same content have any discrepancy in the content.

23. A data management method, comprising a step of storing in a nonvolatile semiconductor storage section, together with each of a plurality of data segments that are distributed to sectors, a sector being a logical data management unit, link information indicating an ordinal relationship of the data segments based on the distribution of the data segments to the sectors and having information about an immediately-previous data storage site and an immediately-subsequent data storage site for each of the data segments distributed to the sectors.

24. A data management method according to claim 23, further comprising steps of:
- searching a leading sector of data corresponding to an identification (ID) number supplied by the software and comparing information about an immediately-previous data storage site of link information stored in the leading sector with data where all bits indicate the state that a block is erased; and
- informing, when the comparison result is negative, software that there is an error in the link information.

25. A data management method according to claim 24, further comprising steps of:
- searching a leading sector of data corresponding to an identification (ID) number supplied by the software, and when the last sector is referred to comparing information about an immediately-subsequent data storage site of link information stored in the last sector with data where all bits indicate the state that a block is erased; and
- informing, when the comparison result is negative, the software that there is an error in the link information.

26. A data management method according to claim 24, further comprising a step of correcting information about a data storage site by using an error-correcting code when any discrepancy exists between information about data storage sites.

27. A data management method according to claim 24, further comprising a step of informing software when a plurality of link information having the same content have any discrepancy in the content.

28. A data management method according to claim 23, further comprising steps of:

searching a leading sector of data corresponding to an identification (ID) number supplied by software, and when the last sector is referred to, comparing information about an immediately-subsequent data storage site of link information stored in the last sector with data where all the bits indicate the state that a block is erased; and informing, when the comparison result is negative, software that there is an error in the link information.

29. A data management method according to claim 23, further comprising a step of confirming for each distributed data segment, when the link information is referred to, whether or not any discrepancy exists between information about an immediately-subsequent data storage site which is stored in each sector and information about an immediately-previous data storage site which is stored in a next sector indicated by the information about the immediately-subsequent data storage site.

30. A data management method according to claim 29, further comprising steps of:

referring, for the purpose of confirming whether or not any discrepancy exists between information concerning data storage sites, data indicated by information about an immediately-subsequent data storage site which is included in link information of one of the distributed data segments; and comparing information about an immediately-previous data storage site of link information stored in an immediately-subsequent sector with information about an immediately-previous data storage site.

31. A data management method according to claim 23, further comprising a step of confirming for each distributed data segment, by using each pair of link information, when at least the link information is referred to, whether or not any discrepancy exists between information about an immediately-subsequent data storage site which is stored in each sector and information about an immediately-previous data storage site which is stored in a next sector indicated by the information about the immediately-subsequent data storage site.

32. A data management method according to claim 31, further comprising a step of correcting a plurality of link information having the same content when the content involves any discrepancy, such that data involving the discrepancy is corrected by using data involving no discrepancy.

33. A data management method according to claim 23, further comprising steps of:

confirming, when one of the plurality of link information having the same content is referred to, by using a pair of link information, whether or not any discrepancy exists between information about an immediately-subsequent data storage site which is stored in each of distributed sectors and information about an immediately-previous data storage site which is stored in a next sector indicated by the information about the immediately-subsequent data storage site; and performing another information by using another pair of link information if any discrepancy exits.

34. A data management method according to claim 23, further comprising a step of informing software when a plurality of link information having the same content have any discrepancy in the content.

* * * * *